(12) United States Patent
Josephsoon et al.

(10) Patent No.: US 7,861,188 B2
(45) Date of Patent: *Dec. 28, 2010

(54) ELECTRIC DEVICE CONTROL APPARATUS AND METHODS FOR MAKING AND USING SAME

(75) Inventors: Jonathan Josephsoon, Austin, TX (US); Kurt Edward Nalty, Austin, TX (US)

(73) Assignee: Revelation and Design, Inc, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/891,322

(22) Filed: Aug. 9, 2007

(65) Prior Publication Data

US 2008/0034331 A1 Feb. 7, 2008

Related U.S. Application Data

(63) Continuation of application No. 10/384,195, filed on Mar. 7, 2003.

(60) Provisional application No. 60/363,024, filed on Mar. 8, 2002.

(51) Int. Cl.
*G06F 3/00* (2006.01)

(52) U.S. Cl. .................. 715/863; 715/719; 345/168; 345/156; 345/158; 382/118; 382/115; 382/116

(58) Field of Classification Search ........... 715/863, 715/719; 345/168, 156, 158; 382/118, 115, 382/116, 103, 100
See application file for complete search history.

(56) References Cited

U.S. PATENT DOCUMENTS

| | | | |
|---|---|---|---|
| 2,421,881 A | 6/1947 | Heasty | 200/155 |
| 2,863,010 A | 12/1958 | Riedel | 200/5 |
| 3,625,083 A | 12/1971 | Bose | 74/471 XY |
| 4,305,223 A | 12/1981 | Ho | 46/228 |
| 4,350,903 A | 9/1982 | Jimerson et al. | 307/252 B |
| 4,672,229 A | 6/1987 | Skarman et al. | 307/115 |
| 4,716,409 A | 12/1987 | Hart et al. | 340/825.22 |
| 4,719,446 A | 1/1988 | Hart | 340/310 A |
| 4,745,351 A | 5/1988 | Rowen et al. | 323/239 |
| 4,764,708 A | 8/1988 | Roudeski | 315/51 |
| 4,837,665 A | 6/1989 | Hoyer et al. | 362/96 |
| 4,924,109 A | 5/1990 | Weber | 307/126 |
| 4,933,670 A | 6/1990 | Wislocki | 340/709 |
| 5,455,748 A | 10/1995 | Cotten et al. | 362/85 |
| 5,668,537 A | 9/1997 | Chansky et al. | 340/825.06 |
| 5,691,517 A | 11/1997 | Yamamoto et al. | 200/6 A |
| 5,716,129 A | 2/1998 | Kunen et al. | 362/394 |
| 5,719,450 A | 2/1998 | Vora | 307/116 |

(Continued)

FOREIGN PATENT DOCUMENTS

WO WO 00/46657 8/2000

*Primary Examiner*—Weilun Lo
*Assistant Examiner*—Mylinh Tran
(74) *Attorney, Agent, or Firm*—Robert W. Strozier

(57) ABSTRACT

An electrical switch apparatus including a movement sensitive form is disclosed. The apparatus includes a housing, a motion sensor and a processing unit, where motion on, near or about the motion sensor is translated into output commands adapted for list scrolling, where the list can be arranged in a hierarchy such as menus or for changing a value of an attribute of a electrical device under the control of the switch.

10 Claims, 22 Drawing Sheets

U.S. PATENT DOCUMENTS

| | | | |
|---|---|---|---|
| 5,726,644 A | 3/1998 | Jednaez et al. | 340/825.52 |
| 5,751,260 A | 5/1998 | Nappi et al. | 345/8 |
| 5,973,420 A | 10/1999 | Kaiserman et al. | 307/139 |
| 6,064,297 A | 5/2000 | Odinak et al. | 340/310.01 |
| 6,160,899 A * | 12/2000 | Lee et al. | 382/103 |
| 6,192,282 B1 | 2/2001 | Smith et al. | 700/19 |
| 6,345,111 B1 * | 2/2002 | Yamaguchi et al. | 382/118 |
| 6,396,523 B1 * | 5/2002 | Segal et al. | 715/863 |
| 6,559,828 B1 * | 5/2003 | Impio | 345/156 |
| 6,624,833 B1 * | 9/2003 | Kumar et al. | 715/863 |
| 6,750,848 B1 * | 6/2004 | Pryor | 345/168 |
| 2001/0045897 A1 | 11/2001 | Wolff | 340/815.73 |
| 2002/0191029 A1 * | 12/2002 | Gillespie et al. | 345/810 |

* cited by examiner

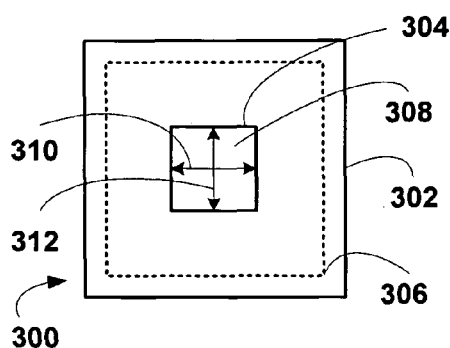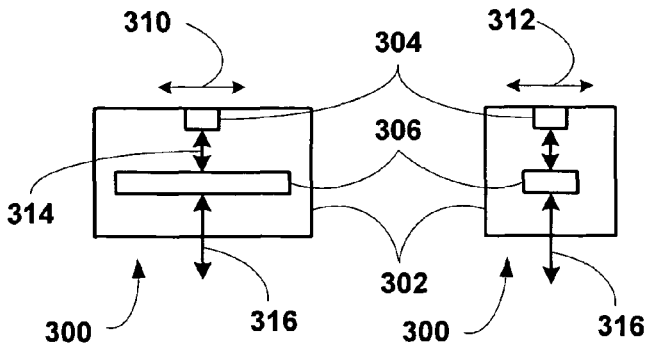
FIG. 3A  FIG. 3B  FIG. 3C
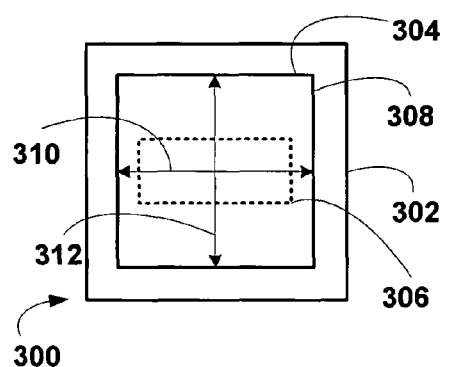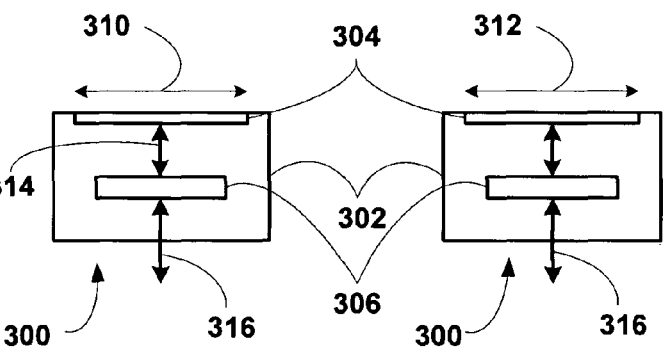
FIG. 3D  FIG. 3E  FIG. 3F
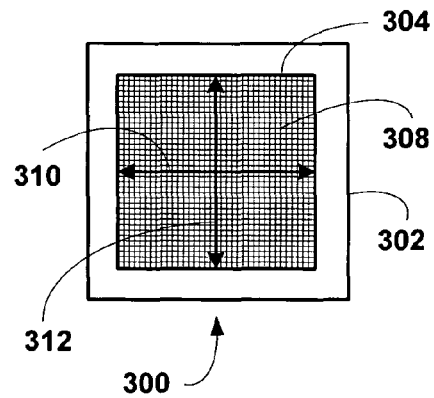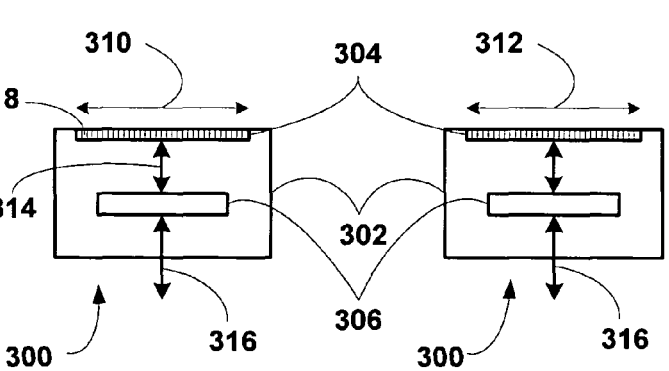
FIG. 3G  FIG. 3H  FIG. 3I

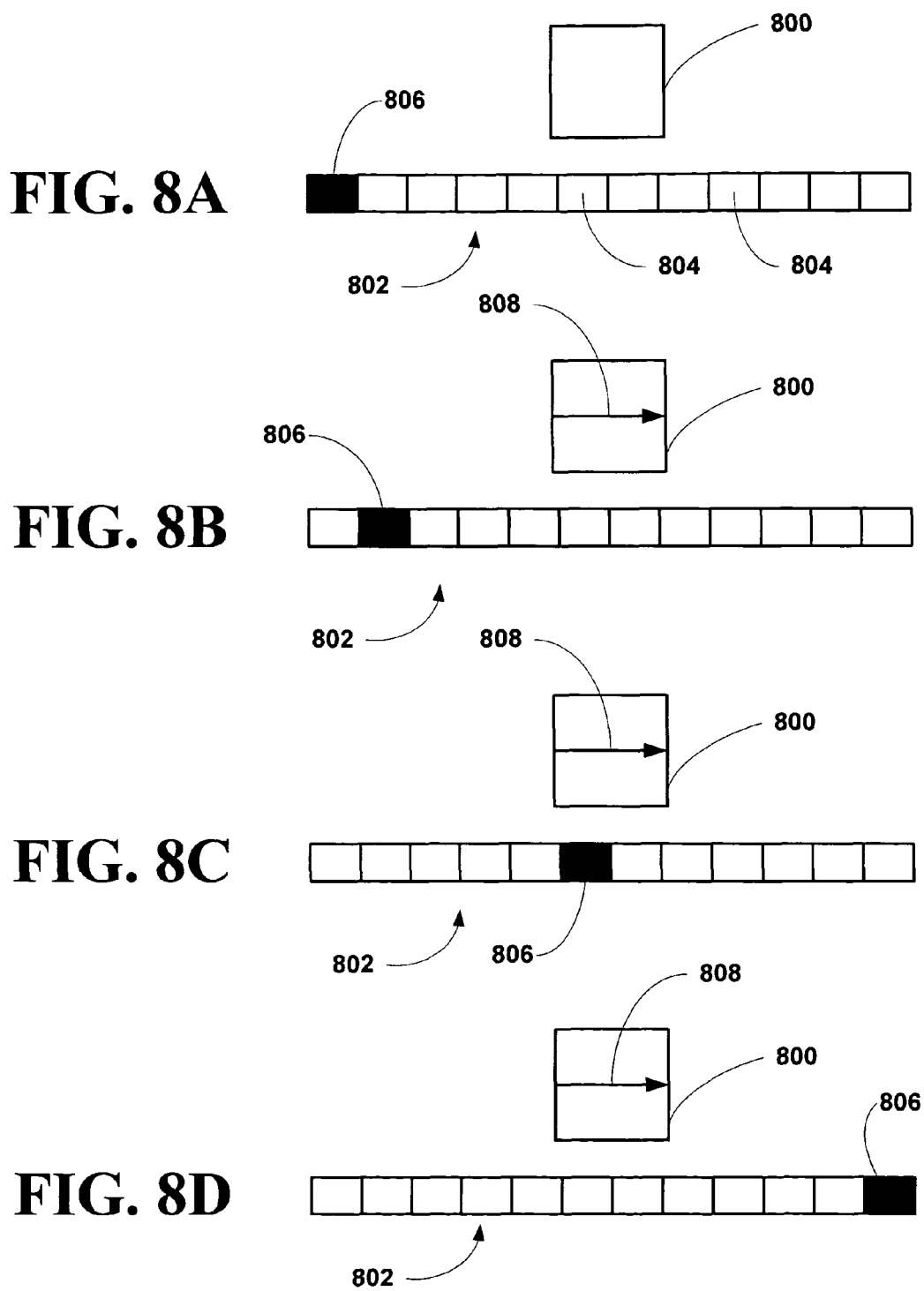

ELECTRIC DEVICE CONTROL APPARATUS AND METHODS FOR MAKING AND USING SAME

RELATED APPLICATIONS

This application is a continuation of U.S. patent application Ser. No. 10/384,195 filed 7 Mar. 2003, which claims provisional priority of U.S. Provisional Patent Application Ser. No. 60/363,024, filed 8 Mar. 2002.

BACKGROUND OF THE INVENTION

1. Field of the Invention

The present invention relates to an electrical device control apparatus and methods for making and using same.

More particularly, the present invention relates to an electrical device control apparatus including a multi-device switch, a user interface responsive to movement of a human or animal body part in at least two different directions, such as an x direction and a y direction, and software adapted to convert movements in the at least two directions into selection commands and/or switch commands sufficient to cause a desired selection and/or effect.

2. Description of the Related Art

The demand and requirement for electrical switches continues to accelerate. In fact, in residential and commercial environments, the number of electrical switches has grown as fast or faster than the number of new electrical devices introduced in the marketplace. As the number of electrical switches has increased, the need for sure, certain activation and deactivation of the switches has become ever more apparent.

For example in both residential, industrial and commercial environments, overhead lighting is typically controlled by a manual on-off switch on the wall. The switch is in the form of a mechanical lever that simply causes the circuit to open or close. Very little has changed over the years in this ubiquitous standard electrical switch.

Some minor variations, however, are found in the prior art. U.S. Pat. No. 2,421,881 to Heasty discloses the use of a rotatable disk with a number of recesses around its periphery. The disk is supported on a hub and two electric contact arms provide electric current through conductor rods in alternately spaced recesses. As the disk is rotated, electrical contact is made and then broken.

U.S. Pat. No. 2,863,010 to Riedl discloses a spring loaded push plate that is designed to activate all electrical contacts underneath the plate at once or to selectively engage electric contacts underneath the plate by rocking the plate in the direction of the desired electrical contact.

Additionally, it is known in the art to provide variable control over electrical devices, for example, again, lighting fixtures, by means of so-called dimmer switches. Functioning in a manner well-known in the art, the dimmer switch is activated by the well-known lever or, in some cases, by a knob that is simply twisted.

The longevity of the standard, mechanical, electrical wall light switch is testimony to its functional practicality. Nonetheless, as the demand for, and number of, electrical switches has multiplied with the multiplication of electrical devices found within residential and commercial environments, as indicated above, a need has arisen for an electrical switch with expanded capabilities. Thus, there is a need in the art for an electrical switch capable of manipulating multiple electrical devices without the requirement of mechanically opening and closing switches. Further, there is a need in the art for providing an electrical switch that is easily modified to accept operational control of additional electrical devices after installation of the switch. Still further, there is a need in the art for providing an electrical switch that is aesthetically and ergonomically pleasing.

SUMMARY OF THE INVENTION

Electrical Device Control Systems of this Invention

Accordingly, the present invention provides an electrical device control system including a multi-device switch, an user interface responsive to movement of a human or animal body part in at least two different directions, such as an x direction and a y direction, and software adapted to convert movements in the at least two directions into a switch command, where the switch command is a devices selection command or a device action command.

The present invention also provides an electrical device control system having no mechanical on-off switches, where the apparatus maintains an open circuit to all controlled electrical devices and controls device behavior by controlling a current flow to each device, where an "OFF" condition corresponds to a current flow below a device operating current flow, a threshold current, a substantially zero current, a substantially zero voltage, a voltage below a device threshold voltage or a voltage below a device operating voltage.

The present invention also provides an electrical device control system including a housing having an user interface mounted in a top surface thereof and a multi-device switch in an interior thereof, where the interface and the switch are in electrical communication. The interface includes a sensor adapted to sense movement of a body part of a human or animal and convert the sensed movement into an interface output signal. The switch includes a digital and/or analog processing unit, preferably a digital microprocessor, adapted to convert the interface output signal into either a device selection scroll or a device attribute control output, where the device selection scroll cycles through a list of devices controlled by the switch and the device attribute control output produces a desired adjustment to an attribute of a selected device, such as amplitude, phase, frequency, temperature, modulation, flow, humidity, etc. Thus, the apparatus can be used to control all attributes of each device attached to the switch. For example, the apparatus could control an intensity of light produced by one or a multitude of lights, control the temperature of a room, control the temperature and cooking time of an oven, control an autoclave sterilization cycle, control a drug administration cycle, control a process control cycle, control audio equipment, control visual equipment, control audio-visual equipment, or the like. It should be recognized that an attribute of a device is any adjustable control associated with the device regardless of the exact nature of the attribute.

The present invention also provides a control system for remotely controlling devices in a room or area removed from the system or isolated from the system.

The present invention also provides a system of multiple electrical devices including, an electrical switch apparatus for manipulating the multiple electrical devices, which includes a rotatable sphere or ball and a housing conformed to receive and retain the sphere or ball so that the ball can move relative to the housing. The electrical switch apparatus also includes an optical sensor adapted to sense physical movement of the sphere and to convert the sensed physical movement into first input control signals. The electrical switch apparatus also includes a housing sensor adapted to sense receive physical movement of the housing and to convert the sensed physical movement into to second input control signals. The electrical switch apparatus also includes a microprocessor connected to the optical sensor and to the housing sensor and to the multiple devices and adapted to convert the first and second input signals to devices output control signals for manipulating attributes of the multiple electrical devices. The first input control signals resulting from movement of the sphere in a direction creates output control signals for the selection of one of the multiple electrical devices. Once a device is selected, the first input control signals resulting from movement of the rolling sphere in a different direction creates output control signals for variable control of the devices. Alternatively, the second input control signals resulting from movement of the housing selects one of the multiple electrical devices for manipulation, and the first input control signals variably control an attribute of the selected device.

The present invention also provides a system where movement of the rolling sphere or ball in a first direction creates output control signals for the selection of one of the multiple electrical devices for manipulation and movement of the rolling sphere in a second direction creates output control signals for variably controlling an attribute of the selected device.

The present invention also provides a system where movement of the housing creates output control signals for the selection of one of the devices, while movement of the rolling sphere creates output control signals for variably controlling an attribute of the selected device.

The present invention also provides a system including a motion sensor where movement of within the sensing zone of the sensor in a first direction creates output control signals for the selection of one of the multiple electrical devices for manipulation and movement of within the sensing zone of the sensor in a second direction creates output control signals for variably controlling an attribute of the selected device. Moreover, the system can allow attribute selection by continued motion in the second direction followed by motion in a third direction to variably control the selected device attribute. Furthermore, the system can include a preset or programmable sequence of motions within the motion sensor sensing zone, where the sequence cause a preset or pre-programmed response of the selected device. Additionally, the system can utilize the preset or programmable sequences to control all of the devices or any subset of the devices, where different patterns or sequences can result in a preset or pre-programmed global or partial global preset—mood lighting, music settings and selections, etc.

Method for Using the Control System of this Invention

The present invention provides a method for manipulating one electrical device or a plurality of electrical devices using a system of this invention, including the steps of sensing motion within a sensing zone of a motion sensor in a first direction, converting the sensed motion into an output control signal adapted to scroll through the devices or preset collections of devices, sensing motion within the zone of the sensor in a second and different direction resulting in selection of a device or a preset collection of devices, and converting the sensed motion into control signals adapted to variably control an attribute of the selected device depending on a direction of motion in the second direction. If the selected device has more than one attribute, then the method can allow include the step of converting the sensed motion in the second direction into an output signal adapted to scroll through the attributes and sensing motion in a third direction different from the second direction and converting the sensed motion into control signals adapted to variably control an attribute of the selected device depending on a direction of motion in the third direction. Moreover, the method can include converting a patterned motion into an output signal adapted to select a preset or programmed response of the selected device or collection of devices.

The present invention also provides a method of manipulating at least one electrical device using a system of this invention, including the steps of providing a rotatable sphere or ball in a conforming housing and sensing rotation of the ball in a first direction with a motion sensor such as an optical sensor and converting the sensed motion into first input control signals. The method also includes the steps of processing the input control signals in a microprocessor into device selection outputs. The method also includes the steps of sensing rotation in a second, different direction and converting the sensed motion in the second direction into second input control signals and processing the second input control signals into attribute control signals depending on a direction of the second motion and forwarding the attribute control signals to the device resulting in a change in the attribute. Again, the method also include steps for selecting an attribute from an attribute list due to motion in the second direction and sensing motion in a third direction, different from motion in the second direction, for attribute control.

The method can also include the steps of providing multiple electrical switch apparatuses, each controlling multiple electrical devices and step for selecting each switch and devices associated with each switch, where the devices can include lighting devices, motion devices, security control devices, sound devices, gas control devices, water control devices, air handling (heating and cooling) control devices, temperature control devices or the like.

User Interfaces of this Invention

The present invention also provides an user interface responsive to movement within a sensing zone such as movement of a human or animal, a human or animal body part or an object under the control of an human or animal, where the interface is capable of sensing motion in more than one direction, preferably in a plurality of different directions and where the interface converts the sensed motion into output signals capable of being used as control signals.

The present invention also provides an user interface responsive to movement of a human or animal, a human or animal body part or an object under the control of an human or animal in at least two directions, where the directions are different, motion in a first direction scrolls through a selection list and motion in a second and different direction from a given scroll position corresponding to a desired selection results in generation of a command to change a value of an attribute associated with the selection.

The present invention also provides an user interface responsive to movement of a human or animal, a human or animal body part or an object under the control of an human or animal in at least two directions, where the directions are different, motion in a first direction scrolls through a device list or an available (on-line) device list and motion in a second direction from a desired scroll position corresponding to a desired device results in generation of a command to change in an attribute associated with the selected device.

The present invention also provides an user interface responsive to movement of a human or animal, a human or animal body part or an object under the control of an human or animal in at least two directions, where motion in a first direction scrolls through a list of available (on-line) devices, a dynamic list, or a static device list and motion in a second direction from a scroll position corresponding to a desired selection scrolls through an attribute list associated with the selection and motion in a third direction from an attribute scroll position corresponding to a desired attribute of the selection changes a value of that attribute, and where the first and second directions are different and the second and third directions are different, while the first and third directions can be the same or different. This process of changing directions to cause a selection and eventually causing a change in an attribute of a selected device can be continued ad infinitum. A list is considered to be static if it simply lists all devices that are attached to a switch, whether they are in an active or inactive state; while a dynamic list is a list that permits only selection from those devices that are active. The term inactive means that the device can no longer be controlled by the interface, while the term active means that the device can be controlled by the interface. Moreover, the interface can be designed to sense motion in one direction and continue processing the result caused by the motion until motion in a different direction is sensed. Thus, the interface would sense an initial motion and would assume that that motion is continued until it senses motion in a different direction without requiring the actual continuation of motion in a given direction for obvious reasons. Furthermore, the interface can be designed to sense motion and function in that state while the moving object is subsequently at rest (move then hold) and the interface would act as if motion in the given direction is continuing. For example, if the motion is associated with a selection list, then an initial movement would invoke a continuous scroll through the list which would be interrupted only by motion in a different direction which would select the list member and either activate a secondary list or activate an attribute control, where a change to the attribute control would depend on the direction of the motion, e.g., up would increase the attribute value, down would decrease the attribute value.

The present invention also provides an user interface responsive to movement of a human or animal, a human or animal body part or an object under the control of an human or animal in at least two directions, where motion in a first direction scrolls through a static or dynamic device selection list and motion in a second direction from a scroll position corresponding to a desired device scrolls through an attribute list associated with the selected device and motion in a third direction from an attribute scroll position corresponding to a desired attribute of the selected device changes a value of that attribute, and where the first and second directions are different and the second and third directions are different, while the first and third directions can be the same or different. This process of changing directions to cause a selection and eventually causing a change in an attribute value of a selected device can be continued ad infinitum.

The present invention also provides an user interface responsive to movement of a human or animal, a human or animal body part or an object under the control of an human or animal in at least two directions, where motion in a first direction scrolls through a first dynamic or static selection list, motion in a second direction from a first scroll position corresponding to a desired first selection scrolls through a second dynamic or static selection list associated with the first selection, motion in a third direction from a second scroll position corresponding to a desired second selection scrolls through attributes associated with the second selection, and motion is a fourth direction from a third scroll position corresponding to a desired attribute changes a value of that attribute, and where the first and second directions are different, the second and third directions are different, the third and fourth directions are different, while the first and third directions can be the same or different and the second and fourth directions can also be the same or different. This process of changing directions to cause a selection and eventually causing a change in an attribute of a selected device can be continued ad infinitum.

The present invention also provides an user interface responsive to movement of a human or animal, a human or animal body part or an object under the control of an human or animal in at least two directions, where motion in a first direction scrolls through a list of available (on-line) multi-device switches (MDSs), a dynamic list, or a list of MDSs, a static list, motion in a second direction from an MDS scroll position corresponding to a desired MDS scrolls through a static or dynamic list of devices controlled by the selected MDS, motion in a third direction from a device scroll position corresponding to a desired device scrolls through available attributes associated with the selected device, and motion is a fourth direction from a third scroll position corresponding to a desired attribute of the selected device changes a value of that attribute, and where the first and second directions are different, the second and third directions are different, and the third and fourth directions are different, while the first and third directions can be the same and the second and fourth attributes can also be the same. This process of changing directions to cause a selection and eventually causing a change in an attribute of a selected device can be continued ad infinitum.

The present invention also provides an user interface including a position selection unit and a motion sensing unit, where the selection unit includes a plurality of selection buttons, a plurality of active selection positions, a selection slide ring, a touch sensitive selection menu, or any other selection device, where the motion sensing unit is responsive to movement of a human or animal, a human or animal body part or an object under the control of a human or animal in at least two directions, where the directions are different, motion in a first direction corresponds to one type of action and motion in the second direction corresponds to a second type of action. The action types can be a selection action via menu or icon scrolling, an attribute selection action via menu or icon scrolling or a change in a attribute value where the direction of motion controls the direction of change of the value of the attribute.

The present invention also provides an user interface including a position selection unit and a motion sensing unit, where the selection unit includes a plurality of selection buttons, a plurality of active selection positions, a selection slide ring, a selection slide, a touch sensitive selection menu, or any other selection device, where the motion sensing unit is responsive to movement of a human or animal, a human or animal body part or an object under the control of a human or animal in at least three directions, where the successor directions are different, motion in each of the directions corresponds to a selection action via menu or icon scrolling, an attribute selection action via menu or icon scrolling or a change in a attribute value via motion in to opposing directions such as up or down or right or left.

The present invention also provides a movement sensitive form in one direction that creates output control signals for the selection of at least one of a plurality of independent electrical devices.

The present invention also provides a movement sensitive form in one direction that creates output control signals for variable control of the at least one attribute of at least one independent electrical device.

The present invention also provides a movement sensitive form including a movable housing in control disposition to a plurality of independent electrical devices via a digital and/or analog processing unit such as a microprocessor or microcontroller such that movement of the housing selects at least one of the plurality of independent electrical devices for manipulation, while movement in a different direction changes a value of an attribute associated the selected independent device(s). In one preferred embodiment, the movement sensitive form is moveable and in another aspect of this invention, the form includes a movable object such as a rotatable sphere retained in the housing. In another embodiment, the present invention also provides a movement sensitive form that is internally lighted. In another embodiment, the housing is conformed to enable in and out movement of the movement sensitive form. In another embodiment, output signals for variable control continue as long as movement of the form or the movable object associated with the form continues. In another embodiment, output signals for variable control continue until movement in a different direction is sensed by the movement sensitive form. In another embodiment, the movement sensitive form contains fluid with suspended material.

Methods for Using the User Interfaces of this Invention

The present invention also provides a method for controlling devices comprising the step of moving a body, a body part or an object associated with a body or body part in an active zone of an user interface of this invention, selecting at least one of a plurality of electrical devices, and changing a value of at least one attribute of the selected devices, where the interface can include only a motion sensing unit or a position selection unit and a motion sensing unit, where the selection unit includes a plurality of selection buttons, a plurality of active selection positions, a selection slide, a selection slide ring, a touch sensitive selection menu, or any other selection device, where the motion sensitive unit is responsive to movement of a human or animal, a human or animal body part, or an object associated with a human or animal in at least two directions, where successor directions are different.

DESCRIPTION OF THE DRAWINGS

The invention can be better understood with reference to the following detailed description together with the appended illustrative drawings in which like elements are numbered the same:

FIGS. 3A-C depict three views, top and two side views, of a preferred user interface of this invention;

FIGS. 3D-F depict three views, top and two side views, of another preferred user interface of this invention;

FIGS. 3G-I depict three views, top and two side views, of another preferred user interface of this invention;

FIGS. 8A-D depict scrolling through a selection list with motion in one direction relative to an user interface of this invention;

DETAILED DESCRIPTION OF THE INVENTION

Figure 1A:
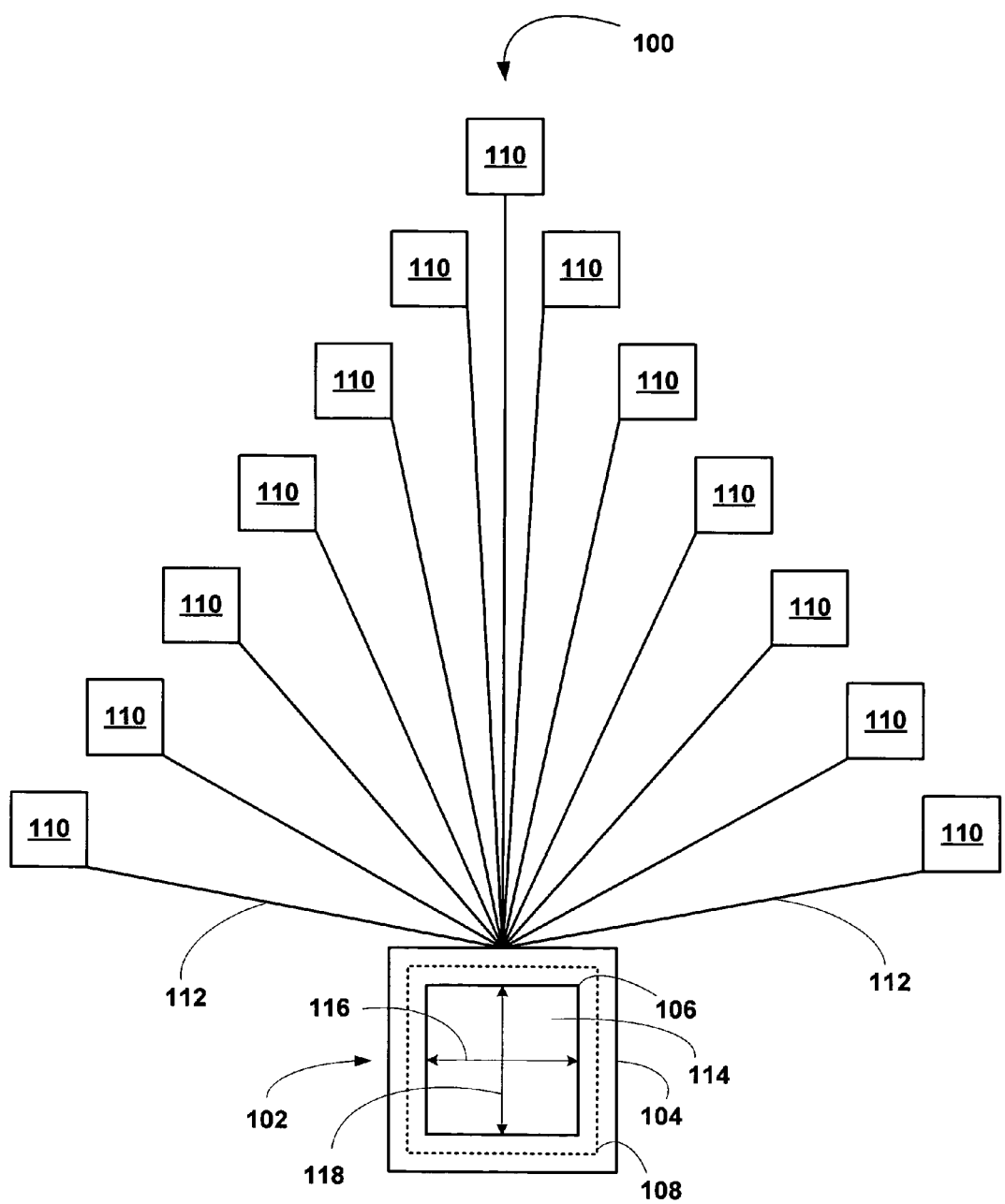
FIG. 1A depicts a preferred embodiment of an electrical device control system of this invention including a single multi-device switch.

The inventors have found that a new multi-device electrical switch can be constructed which allows many electrical devices and/or appliances to be managed by a single multi-device switch or by a plurality of such switches either under central or distributed control. The inventors have also found that the switches can be controlled by a novel movement sensitive human or animal interface which is capable to discerning motion of a human or animal, a human or animal body part, or an object under the control of an animal or human in at least two direction, where motion in one direction allows selection of any one device or some or all devices controlled by the switch(es), device selection, and motion in the other direction controls a value of at least one attribute associated with the selected device(s), attribute control. The inventor have found that the motion can be due to direct interface contact or, and more preferred, by simple motion in a motion sensitive area and/or volume and/or zone associated with an outer surface of the interface.

The present invention broadly relates to an electrical device control system including an user interface and one or a plurality of multi-device switches (MDSs), each MDS controlling one or a plurality of electrical devices, where the interface senses motion in at least two directions and converts the sensed motion into output signals that cause a processing unit to either scroll through a selection list or to select and change an attribute value of at least one controlled device, where each direction is different from its predecessor and its successor and where motion in a final direction causes the processing unit to change an attribute value of at least one controlled device. In addition to a user interface and an MDS, the systems of this invention can also include security devices such as finger print, hand print, retinal, voice, other electronic security systems, key locks, any other type of mechanical locking mechanism, or mixtures or combinations thereof. Such security devices can include separate sensors or can use the same sensor used by the interface. Thus, an active pad sensor could be used not only to sense motion, but also to form an image of a finger print or hand print, while an optical sensor could also support a retinal scan function.

The present invention also broadly relates to an electrical switch apparatus or device control system including an user interface and a multi-device switch (MDS) controlling a plurality of electrical devices, where the interface converts movements of a human or animal body part in one direction to device list scroll commands and movements in a different direction into device attribute change commands.

The present invention also broadly relates to an user interface adapted to convert motion of a human or animal, a human or animal body part or an object under the control of an animal or human in at least two directions into either list scroll commands or selection/attribute change commands.

The present invention also broadly relates to an user interface adapted to convert motion of a human or animal, a human or animal body part or an object under the control of an animal or human in a plurality of directions to list scroll commands, one list associated with change in direction, where each direction is different from its predecessor and successor directions and where motion in a final direction is converted into attribute change commands, where the final direction is different from its predecessor direction.

The present invention also broadly relates to methods for controlling devices with an MDS or a system including at least on MDS of this invention, to methods for installing MDSs of this invention, to methods for controlling a plurality of MDSs and devices associated therewith an user interface of this inventions.

The MDS of this invention are designed to supply a given wattage to each device it controls. Because the MDSs of this invention can handle and distribute a fairly large amount of power, the MDSs of this invention can control large numbers of devices such as banks of lights.

The present invention relates to a light control system including a plurality of lights in electrical communication with at least one MDS of this invention, where each light can be controlled separately, groupings of lights can be controlled collectively or all of the lights, as a single group, can be controlled collectively depending on a wiring configuration of the lights.

The present invention relates to a home control system including a central control unit and a plurality of MDSs of this invention, where each MDS controls a plurality of electrical devices within the house and the central control unit in turn controls each of the MDSs.

The present invention relates to a home control system including a central control unit and a plurality of MDSs of this invention, where each MDS controls a plurality of related electrical devices within the house and the central control unit controls each of the MDSs, where the related devices are devices the user associates with each MDS. For example, one MDS may control the lights in a room, while another MDS controls audio-visual devices in the room and one MDS controls environmental control equipment such as air conditioners, air humidifiers/dehumidifiers, heaters, air purifiers, water purifiers, water conditions or the like.

The user interface of this invention allows the user to select an electrical device and change a value of an attribute associated with the device without invoking any hard selection protocol, such as a mouse click or double click, touch or double touch of a pad, or any other hard selection process. The user interface simply tracks motion in proximity to the interface, and when the motion changes direction by an amount sufficient to trigger a software threshold direction change value, the software either issues a scroll command or a selection/attribute value change command. Although the movements are preferably in directions which are easy to discern such as motion in the x and y direction, an ordinary artisan should recognize that the directions need not be orthogonal and need not be in an essentially x or y direction, but can be in any two arbitrary directions capable of being discriminated there between and can actually be set on the fly. Thus, when an user moves, moves a body part or move an object under user control in proximity of the interface, the direction of motion is sensed causing either a scroll command or a selection/attribute value change command to be issued by the software. For systems that have more than two levels of drill down lists and/or multiple controllable attributes, more than two change in motion direction are required for selection and attribute value control.

In its simplest form, the switch is either an ON/OFF type switch or a variable control switch such as a dimmer-type switch for lights. The user interface or switch controller can be any motion sensitive or motion sensing interface, including a main component and a motion sensor situation in a control area. The main component can be a touch sensitive screen, an active surface, a rotatable ball, or any other device that permits the sensor to discern motion in at least two directions, or mixtures or combinations thereof. The controller can be mechanical, inductive, capacitive, optical, magnetic, pressure-sensitive, electrostatic, any other type of device capable of changing state or capable of discerning motion in at least two direction, or mixtures or combinations thereof. As motion is detected, the motion is translated into useful controls. For example, movement of a body part or an object under control of a human or animal in an up/down motion may result in toggling a device on or off or changing an attribute of the device in a continuous or discrete manner. The active area or active device of the interface may be of any shape such as round, square, oval, star, or the like. The interface may also include selection rings, selection banners, buttons, or a plurality of active areas, buttons, slides, rings, or other devices or mixtures or combinations thereof.

In one preferred embodiment, the active device of an interface is a ball and the sensor is capable of detecting motion of the ball in at least two directions. In another embodiment, the active device is a simple window, where movement is detected either by moving a body part or an object under control of a human or animal within an active sensing zone, volume or area (e.g., an optical sensor) or by touching (moving across) an active surface. For touchless devices such as optical sensors, movement can be detected at a distance above a surface depending on a focal plane of the optical device. For example, for interfaces that respond to movement close to the surface, the distance can range from the surface to about 1 to 2 inches above the surface.

In the following examples of interfaces of this invention and their use, the interface comprises a rotatable ball in a housing having a sensor that can detect motion of the ball in the housing. A preferred interface is similar to the new roller ball mouse devices for computers. However, in these examples, the ball may be substituted by any other type of interface including a motion sensor, whether now existing or yet invented. The interfaces preferably can sense motion in at least two direction such as up/down (y movement) and side-to-side (x movement). Some interfaces can also detect in/out motion or nearer/farther motion (z movement). These movements can cause menu scrolling, device scrolling, attribute scrolling, switch selecting, device selecting, attribute selecting, and/or attribute adjusting (i.e., changing a value of an attribute associated with a selected device). These interfaces all operate by using motion to select devices and adjust attribute values associated with the selected devices.

In one preferred example, the interface comprises a rotatable polygonal structure with associated motion sensor having a rotatable ball mounted in a center thereof having an associated motion sensor. Rotation of the polygon controls one type of action, while rotation of the ball controls other types of actions. If the polygon is a triangle, this type of interface is ideally suited for controlling lights having 3-way settings, while the ball can be used to select lights and/or act as a dimmer type switch. Alternatively, the ball controls device selection and attribute adjustment, while the polygon controls switch location.

In another preferred example, the interface includes a housing having a ring and a movable ball. Movement of the ball up/down can act as an ON/OFF type switch or a dimmer type switch. For movable rings, moving the ring around could control the color combination of a color active device, i.e., control the red, green and blue values of colored devices such as LEDs, bulbs, colored bulbs, shades, etc. For touch sensitive rings, the position of activation can set the lights to a specific color, shade and/or hue, or can result in continuous changes of color, shade and/or hue due to motion around the ring.

In another preferred example, the interface includes a ball, where ball movement up/down controls brightness of lights or volume of a device, while motion from side to side controls device (e.g., light) selection. The interface can also include touch points to choose different devices or types of devices such as lights, mechanical devices (e.g., a/c, heating, water, etc.), security devices, audio, visual, audiovisual devices, or the like.

In another preferred embodiment of an interface of this invention, the interface includes a split ball, where moving one half controls one attribute of a device, while moving the other half controls another attribute of the device, such as one half controlling the cold water and the other half controlling the hot water. Alternatively, on half can control lights in a room, while the other half control sound, room temperature, etc. In another split ball embodiment, each half is a dimmer type switch for two separate circuits.

In another preferred embodiment of an interface of this invention, the interface includes a flat surface (touch or touchless) having a single active area and associated sensor or a plurality of different active areas and associated sensors, where the single area can be used to control devices or the control can be distributed over the different areas. Thus, the areas can be used to control different attributes of a given device or to control different sets of devices that are either pre-defined or user assigned.

In another preferred embodiment of an interface of this invention, the interface includes a ball mounted in a housing supporting in or out motion of the ball (i.e., motion along a z-axis). The z-axis motion could be used to turn devices on or off, turn all devices associated with a given MDS on or off, activate default setting or other pre-defined device settings or presets. Thus, pushing in on the ball or touching a touch sensitive surface at a specific place would allow the user to activate pre-defined device setting, such as setting all the lights in a room or house to a day, evening, night, party, etc. setting; setting the sound in a room or rooms to a given mode of surround sound; activate security alarm system throughout a house or building; etc.

In another preferred embodiment of an interface of this invention, the interface includes a plurality of movable components and associated sensors such as balls, touch pads, active surfaces, or the like or mixtures thereof, each component and associated sensor assigned to a different switch, assigned to different devices on a given switch, assigned to different groups of switches, assigned to different groups of devices or mixture thereof, where movement allows the user to select and/or control a value of an attribute of a device, a collection of devices, a collection of switches, or a collections of switch and devices.

In another preferred embodiment of an interface of this invention, the interface includes a movable component such as a ball, where the interface also includes a component that lights up when the interface is activated, allowing it to be used as a night light or even a light itself. In another embodiment, an user interface of this invention includes a clear ball such as an acrylic ball or glass ball and associated motion sensor set in a base of a lamp, which provides illumination through the ball. As the ball is rolled, a light inside the base shines up through the ball, illuminating the ball. When the ball is used to control an attribute, the ball brightens or dims depending on the change to the value of the attribute (brighter light–higher value, lower light–lower value). When used to select devices or switches, the ball can change color. This same lighting and color coding arrangement can be used in conjunction with any other interface of this invention. It should be recognized that motion in one, two or more directions causes the corresponding changes in interface brightness and/or color, shade or hue. For interfaces including separate selection devices such as rings, buttons, banners, or the like, interface coloring can change in response to the selection process.

As an example, a tulip light fixture (a base with branches radiating out therefrom or a central shaft with a set of branches radiating therefrom), motion in one direction, such as side to side motion, in an area, zone or volume detectable by an interface of this invention causes selection of each light separately, while motion in a second direction such as up and down motion in the area, zone or volume detectable by an interface of this invention controls intensity of light being emitted by the selected branch, the branch from which the motion changed from side to side to up/down. Of course, the selection of each branch and the light associated therewith can be accomplished using a ring or other type of device selector as described herein.

In another preferred embodiment of an interface of this invention, the interface of this invention includes a first motion sensitive detector comprising a rotatable polygon and its associated motion sensor and a second motion sensitive detector capable of detecting motion in at least two direction. The number of vertices associated with the polygon corresponds to the maximum number of MDS and/or devices controllable by the interface. By rotating the polygon so that a given vertex aligns with a selector or by merely scrolling through a list based on polygon rotation, the user selects a desired MDS or device. The second detector allows the user to select other control levels such as selection of devices controlled by a selected MDS or attribute selection and/or control. Alternatively, the polygon is not a physical device, but a computer generated construct on a touch or touchless sensitive display. Touching or activating a given location results in the selection of a desired MDS or device, while motion in the active area or volume of the second detector results in other selections and/or attribute value control. Alternatively, the interface includes a single motion detector associated with the touch or touchless display displaying the polygon representing the number of devices controllable by the interface. For lights, an user can control the amount of light emitted by each light by moving either from the center to the vertex associated with a desired light to increase the lights output or from the device toward the center to decrease the lights output—maximum at the perimeter of the polygon; minimum at the center. If the user adjusts a desired light to a given output and then desires to set the other lights at that or a corresponding output, the user moves his/her finger in a circular motion about the center point, staying at a given distance from the center point or in a given brightness zone. Then as the user's finger passed over rays or sectors representing the other lights, each light would immediately adjust to the brightness level corresponding to the brightness zone. This type of interface can also be used to control speaker volume in areas of a home associated with a stereo system, where the volumes in a certain zone in a room can be raised or lowered, where different radial pie slices would correspond to different regions. In a ideal environment, any specific spot or area of a room can be controlled, where the room is represented by an infinite number of rays radiating from a center point to a perimeter of the room and motion sensed by the controller in any outward direction causes a corresponding volume gain in the corresponding area. So if you chose to move in one direction from the center outward, that corresponding the volume experienced in that area of the room would increase. If you stopped mid-way between the center and the perimeter, the volume would be a half. If you moved concentrically (at the same radial distance from the center point) around the center, then the volume in the room would increase to half volume. If the user continued around until the user was back at the start point, then the volume of in each area of the room would be equal, or as equal as possible with the speaker arrangement in the room. Of course, motion from the perimeter inward would lower the volume.

In another preferred embodiment of an interface of this invention, the interface includes a plurality of concentric rings controlling different categories of devices or systems, where the categories can be pre-set or user defined. The rings can be physical or software constructed. Thus, one ring may represent a set of recessed lights or light fixtures around a perimeter of a conference room. By touching one, some or all of light indicators on the ring, their corresponding lights are made active and controllable by the central motion detector such as a ball. As the ball is moved up or down (y motion), the active lights brighten or dim. After these lights have been set, the user can deactivate those lights and activate other lights repeating the output adjustment. By motion side to side or right to left (x motion), the user can select from the activated lights. Then the user can roll up or down, selecting and adjusting the output of the selected light. By seeing an indicator on the switch, it may in this way be easier to know which light is being activated. It may be useful for the fixture itself to briefly pulse so the operator would more easily identify which light is being controlled. The next ring out might control the amount of air coming out from vents, and the other ring may control speaker volume of wall-mounted speakers, etc.

In each of the interface of this invention, motion associated with changing a value of an attribute (light output, volume, temperature, air flow, etc.), the rate of change can correspond to the rate of motion within the active area, zone or volume of the motion detector, but preferably change occurs at a pre-determined rate, which can be preset and non-adjustable or preset and user adjusted.

The interface of this invention can be clear and includes a camera or other video devices, such video devices are ideally suited for baby monitors or other situation where surveillance by a camera in warranted. Moreover, the interfaces and MDSs of this invention can include a port for updating programming or software functionality, where the port can support either wire or wireless interactions.

If the interface of this invention includes a ball, pushing down on the ball can activate a z axis function. In optical interfaces, holding a body part or object under the control of an animal or human in place within the active area, zone or volume for a given period of time can cause the interface to automatically scroll through a device and/or MDS list—activating a z function. Moving the body part close to and then away form the sensor may act to select different devices. The same holds true in variations of each type of sensor use, e.g., in touch-sensitive sensors, tapping on pad or area would change functions at each tap activating the z-function, and once function is chosen, then up/down or y movement may active channel selection function for a TV or radio and x movement (side to side) may control volume. Moreover, the interfaces can be programmed to sense an initial direction of motion and continue processing the corresponding action until motion in a different direction is sensed invoking a selection function and a secondary control function such as a subsequent list scroll function or an attribute value control function. Furthermore, the interfaces can be programmed to recognize a motion pattern or a set of motion patterns, where the pattern can represent an access code for security purposes or a pre-programmed response. For example, a certain series of movements results in setting all the light in a house to a pre-programmed setting, turning on the TV to a pre-programmed channel, adjusting the house temperature to a pre-programmed setting or the like.

In all examples, functions in three different direction such as x, y and z are not limited to volume, brightness, etc., all functions may be mixed, changed and duplicated by movement in any direction, provided that a given direction can be discerned from its immediate predecessor direction. In other words, to use an interface as a dimmer type switch, y movement can result in an on/off function, x movement can result in bright/dim function and z movement can result in color changes or in the number of bulbs activated. Alternatively, motion any direction can result in the brighten/dim function, while other devices such as a ring controllers the on/off function or collective control functions.

All these same functions may be controlled by a joy-stick—x, y and z movement of the joy-stick would correspond to movement of a ball or a body part. Alternatively, simple arrows or buttons can be used.

For radio tuning, a strip could be used to allow tuning by sliding your finger across the surface of the strip. When a desired station is found, either a tap or an up/down movement would select the station. Once selected, movement along the strip would raise or lower the volume. Another tap or up/down movement could switch to tone control (treble/bass), an equalizer control, fade/balance control or the like.

The MDSs and interfaces of this invention can be constructed with modules that can be hot-swappable, where the face plat or sensor is a module capable of being replaced with an upgrade by popping the old out and popping the new in.

In another preferred embodiment of an interface of this invention, the interface include a screen for internet browsing, TV watching, visual monitoring (babies, etc.) or any other visual activity. By touching or with a designated movement (e.g., in the case of touchless controllers) a virtual image of a ball or x, y or z axes are displayed so that the same ideas of motion in proximity of a sensor may be incorporated in a virtual model. The interface can also incorporate holographic displays, where projection from a remote unit would activate with movement within the holographic projection. Movement within the holographic projection could result in scrolling through a list of controllable devices, while change in movement in the holographic projection when a desired device come into view could result in the scrolling of attributes associated with the device or changing of a value of an attribute of a single attribute device. Of course, one of ordinary skill in this art should recognize that this list selection—attribute control scheme can involve drilling up and down through a large number of lists depending on the number of MDSs and the number of attributes associate with each device or MDS.

The interfaces of this invention can also include security detectors and security software to limit access to control processing. The interface could include iris or retinal scanners, finger print scanners, facial type scanners or the like to control access to the control units of this invention.

The optical sensors can also be used as optical touch or touchless pads for notebook computer or drawing tablets. The optical sensors can also be digital or analog camera systems with focal plane set to sense motion within a zone, area or volume in front of the lens. The optical sensors can be operate in any region of the electromagnetic spectrum including, without limitation, RF, microwave, near IR, IR, far IR, visible, UV or mixtures or combinations thereof. Moreover, LCD screen may be incorporated to identify which devices are chosen or the temperature setting, etc. Moreover, the interface can project a virtual control surface and sense motion within the projected image and invoke actions based on the sensed motion. The motion sensor associated with the interfaces of this invention can also be acoustic motion sensor using any acceptable region of the sound spectrum. Of course, the interfaces can include mixtures or combinations of any known or yet to be invented motion sensors.

A timed hold in front of a sensor can be used to activate different functions, e.g., for a sensor on a wall, holding a finger or object briefly in front of sensor causes lights to be adjusted to a preset level. While, continuing to hold, begins a bright/dim cycle that ends when the hand is removed. Alternatively, the timed hold causes an attribute value to change, e.g., if the attribute is at its maximum value, a timed hold would cause the attribute value to decrease at a predetermined rate, until the body part or object is removed from the active zone. If the attribute value is at its minimum value, then a timed hold would cause the attribute value to increase at a predetermined rate, until the body part or object is removed from the active zone. If the value is somewhere in the middle, then the software could allow random selection or would select the direction that would allow maximum control. Of course the interface could allow for the direction to be determined by the initial direction of motion, while the timed hold would continue to change the attribute value until the body part or object is removed from the active zone.

Another interface of this invention includes an external shell (clear or not) having an active fluid contained therein, where movement across the surface induces a detectable movement of active fluid.

All that is required in order for the interface to function properly is that the software must be able to determine when to transition from one command format, such as scrolling through a list to selecting a member from the list, has occurred due to a change in a direction of motion sensed by the interface. Thus, the difference in the direction must be sufficient to allow the software to make such a determination (to detect a discernable change in motion direction), without frustrating the user because the direction change routine does not permit sufficient angular deviation from a given direction before changing from one command format to another, i.e., changing from a list scroll function to an attribute value adjustment function associated with a member of the list. Although the angle deviation can be any value, the value is preferably about $\pm 5°$ from the initial direction, preferably, about $\pm 10°$ from the initial direction and particularly, about $\pm 15°$ from the initial direction. For systems set to run on orthogonal directions, e.g., x and y or x, y and z, the deviation can be as great as about $\pm 45'$, but is preferably about $\pm 35'$ and particularly about $\pm 25°$. Alternatively, movement in a given direction within an angle deviation of $\pm x°$ will result in the control of a single device, while movement in a direction half way between two devices within an angle deviation of $\pm x°$ will result in the control of both devices, where the magnitude of value change can be the same or less than that for a single device and where the value of x will depend on the number of device directions active, but will preferably be less than or equal to $\frac{1}{4}$ of the angle separating adjacent devices. For example, if four devices are located at +x, −x, +y and −y, from a center of the interface, movement in a 45° angle relative to +x and +y would adjust the attribute of both the +x and +y device simultaneously, at a single device rate or at half a single device rate or at any other predetermined rate of attribute value change.

Suitable electrical devices and/or appliance capable of being controlled by the control systems and/or switches of this invention, include, without limitation, any electrical device or appliance having attributes which can be controlled by a switch. Exemplary examples of such attributes include, without limitation, ON, OFF, intensity and/or amplitude, impedance, capacitance, inductance, or any other controllable electrical and/or electromechanical function and/or attribute of the device. Exemplary examples of electrical devices and/or appliances include, without limitation, lighting devices such as indoor and/or outdoor lights or light fixtures, cameras, ovens (conventional, convection, microwave, and/or etc.), dishwashers, stoves, sound systems, display systems (TVs, VCRs, DVDs, cable boxes, satellite boxes, and/or etc.), alarm systems, control systems, medical devices, robots, robotic control systems, hot and cold water supply devices, air conditioning system, heating systems, ventilation systems, air handling systems, computers and computer systems, chemical plant control systems, computer operating systems and other software systems, remote control systems, or the like or mixtures or combinations thereof.

Suitable systems that are amenable to control by the interface of this invention include, without limitation, any analog or digital processing unit having a plurality of software products installed thereon and where each software product has one or more adjustable attributes associated therewith. Exemplary examples of such software products include, without limitation, operating systems, graphics systems, business software systems, word processor systems, internet browsers, accounting systems, military systems, control systems, or the like, or mixtures or combinations thereof.

Suitable digital processing units (DPUs) include, without limitation, any digital processing unit capable of accepting input from a plurality of devices and converting at least some of the input into output designed to control attributes of one or more of the devices. Exemplary examples of such DPUs include, without limitation, microprocessor, microcontrollers, or the like manufactured by Intel, Motorola, Erricsson, HP, Samsung, Hitachi, NRC, Applied Materials, AMD, Cyrix, Sun Microsystem, Philips, National Semiconductor, or any other manufacture of microprocessors or microcontrollers.

Suitable analog processing units (APUs) include, without limitation, any analog processing unit capable of accepting input from a plurality of devices and converting at least some of the input into output designed to control attributes of one or more of the devices. Such analog devices are available from manufacturers such as Analog Devices Inc.

Illustrative Examples of General Control Systems of this Invention

Suitable movement sensing apparatus include, without limitation, digital cameras, optical scanners, optical roller ball devices, touch pads, inductive pads, capacitve pads, holographic devices, laser tracking devices, thermal devices, any other device capable of sensing motion or the like or arrays of such devices or mixture or combinations thereof.

Referring now to FIG. 1A, a preferred embodiment of an MDS control system of this invention, generally 100, is shown to include an MDS 102 having a housing 104 including an user interface 106 and a processing and control unit 108. The system 100 also include a plurality of electrical devices 110 in command communication with the unit 108 along pathways 112, where the communication pathways can include a plurality of electric wires as shown in the figure or can be wireless communication pathways as is well known in the art. Motion of a body part of a human or animal or an object controlled by an animal or human (not shown) about, over or near a surface 114 of the interface 106 in a first direction 116 allows the user to scroll through the electrical devices 110, and motion about, over or near the surface 114 in a second, different direction 118 allows the user to simultaneously select a given device 110 and a change a value of an attribute of the selected electrical device, where motion in the second direction 118 results in device selection and the direction of motion results in changing the value in a positive or negative direction indicate by the arrows associated with the second direction 118. Of course, an ordinary artisan should recognize that the directions 116 and 118 need not be orthogonal and need not be in an essential x or y direction as shown in FIG. 1A. It should be recognized that motion in the +x direction would scroll through the device list in a forward direction, while motion in the −x direction would scroll through the device list in a backward direction. It should also be noted that the interface can be programmed to sense motion in say the +x direction and continue scrolling forward through the device list until motion in the y direction is sensed at which time device selection and attribute control is invoked.

Figures 1B, 1C:
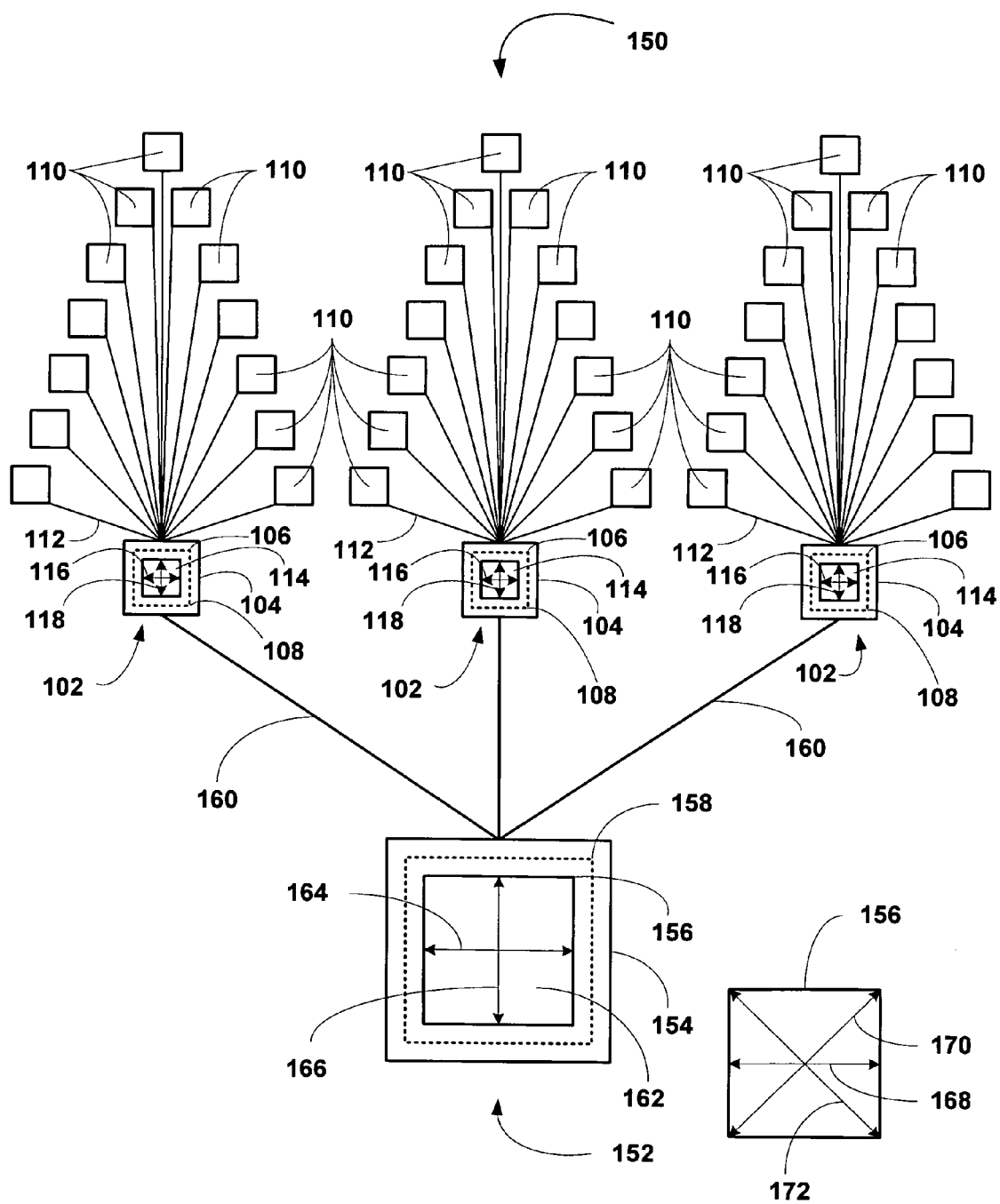
FIG. 1B depicts a preferred embodiment of an electrical device control system of this invention including a central control unit and a plurality of multi-device switches of FIG. 1A.
FIG. 1C depicts another embodiment of an electrical device control system of FIG. 1B.

Referring now to FIG. 1B, another preferred embodiment of an electrical device control system of this invention, generally 150, is shown to include a central control unit 152 having a housing 154 including an user interface 156 and a processing and control unit 158. The central control unit 150 is in command communication via pathways 160 shown here as electric wires with a plurality of MDSs 102. One of ordinary skill in the art should recognize that wires 160 can be replaced by any other type of wired communication pathways such as optical fiber, coaxial cable, twisted pairs, shielded twisted pairs or the like or any type of wireless communication pathways such as RF, ultrasound, laser, maser, IR, near IR, microwave, or the like. Motion of a body part of a human or animal or an object under control of an animal or human (not shown) about, over or near a surface 162 of the interface 156 in a first direction 164 allows the user to scroll through the MDSs 102. While, motion about, over or near the surface 162 in a second, different direction 166 allows the user to scroll through the electrical devices 110 controlled by the selected MDS 102, which is selected by a scroll position when movement in the second direction 166 is sensed. Motion for a second time in the first direction 164 allows the user to change a value of an attribute of a selected electrical device, where the selection corresponds to a scroll position when motion in the first direction 164 is sensed. Thus, a change in direction causes both a selection and a control function to be simultaneously activated, where the control function can be a scroll function in a drill down list hierarchy or a change attribute value function after a device and an associated attribute has been selected. Whether the value of the attribute is increased or decreased depends on whether the motion is to the right or to the left. Moving to the right, the positive x direction, increases the value of the attribute, while moving to the lift, the negative x direction, decreases the value of the attribute.

Of course, an ordinary artisan should recognize that the direction 164 and 166 need not be orthogonal and need not be in an essential x or y direction as shown in here. Moreover, three different directions 168, 170 and 172 could have been used to affect the same result as described above, as shown in FIG. 1C. All that is required is that the software must be able to discern a change from one selection format (scrolling through a list) to a selection of a member in the list by a change in the direction of the motion of the body part or an object under the control of a human or animal over the user interface or within the active sensing zone of the interface. Thus, the difference in the direction need only be sufficient to allow software discrimination without frustrating the user because the direction change routine does not permit sufficient angular deviation from a given direction before causing a scroll selection or other list associated function.

As in FIG. 1A, each MDS 102 includes a housing 104 including an user interface 106 and a processing and control unit 108, which allows for independent user interaction with each switch bypassing the central control unit 152. Each MDS 102 controls a plurality of electrical devices 110 connected to the unit 108 by a plurality of electric wires 112. Motion of a body part of a human or animal or an object under the control of a human or animal (not shown) about, over or near a surface 114 of the interface 106 in a first direction 116 allows the user to scroll through the electrical devices 110, and motion of the body part about, over or near the surface 114 in a second direction 118 allows the user to a change of an attribute of a selected electrical device, where the motion in the second direction 118 results in device selection and the direction on motion results in changing the value in a positive or negative direction indicate by the arrows associated with the second direction 118. Of course, an ordinary artisan should recognize that the direction 116 and 118 need not be orthogonal and need not be in an essential x or y direction as shown here.

Figure 2A:
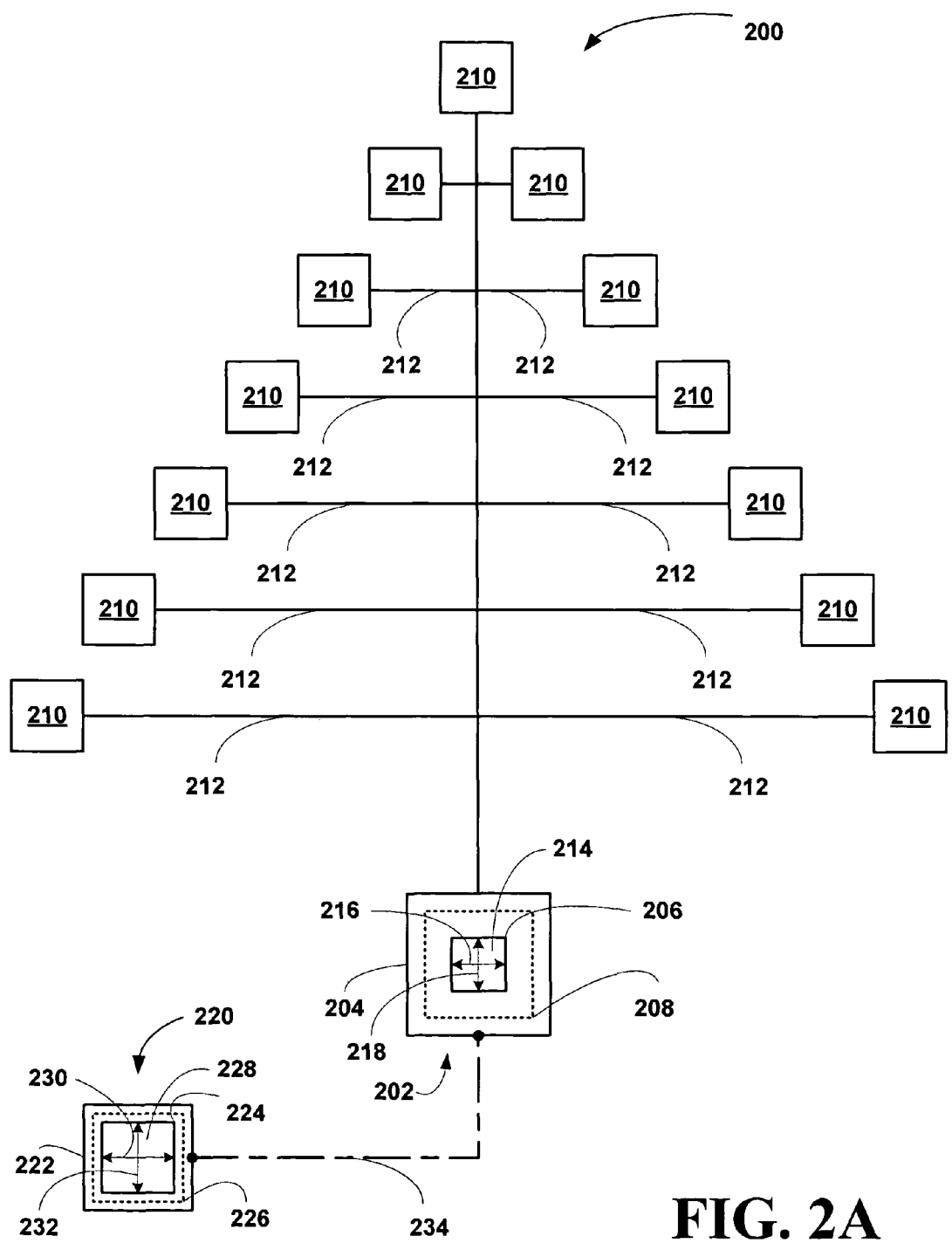
FIG. 2A depicts a preferred embodiment of an electrical device control system of this invention including a single multi-device switch and a handheld control unit.

Referring now to FIG. 2A, another preferred embodiment of an MDS control system of this invention, generally 200, is shown to include an MDS 202 having a housing 204 including an user interface 206 and a processing and control unit 208. The system 200 also includes a plurality of electrical devices 210 in command communication with the unit 108 along pathways 212, where the communication pathways can include a plurality of electric wires as shown in the figure or can be wireless communication pathways as is well known in the art. Motion of a body part of a human or animal (not shown) on, about, over or near a surface 214 of the interface 206 in a first direction 216 allows the user to scroll through the electrical devices 210, and motion of the body part on, about, over or near the surface 214 in a second direction 218 allows the user to a change of an attribute of a selected electrical device, where the motion in the second direction 218 results in device selection and the direction on motion results in changing the value in a positive or negative direction indicate by the arrows associated with the direction 218. Of course, an ordinary artisan should recognize that the direction 216 and 218 need not be orthogonal and need not be in an essential x or y direction as shown in FIG. 2A.

The system 200 also includes a handheld or remote control unit 220 having a housing 222 including an user interface 224 and a processing and control unit 226. Motion of a body part of a human or animal (not shown) on, about, over or near or in proximity to a surface 228 of the interface 224 in a first direction 230 allows the user to scroll through the electrical devices 210 as if the interface 206 was being directly activated, and motion of the body part on, about, over or near or in proximity to the surface 228 in a second direction 232 allows the user to a change of an attribute of a selected electrical device, where the motion in the second direction 232 results in device selection and the direction on motion results in changing the value in a positive or negative direction indicate by the arrows associated with the direction 232. The remote unit 220 is in communication with the MDS 202 via a wire-based and/or a wireless communication pathway or link 234.

Figure 2B:
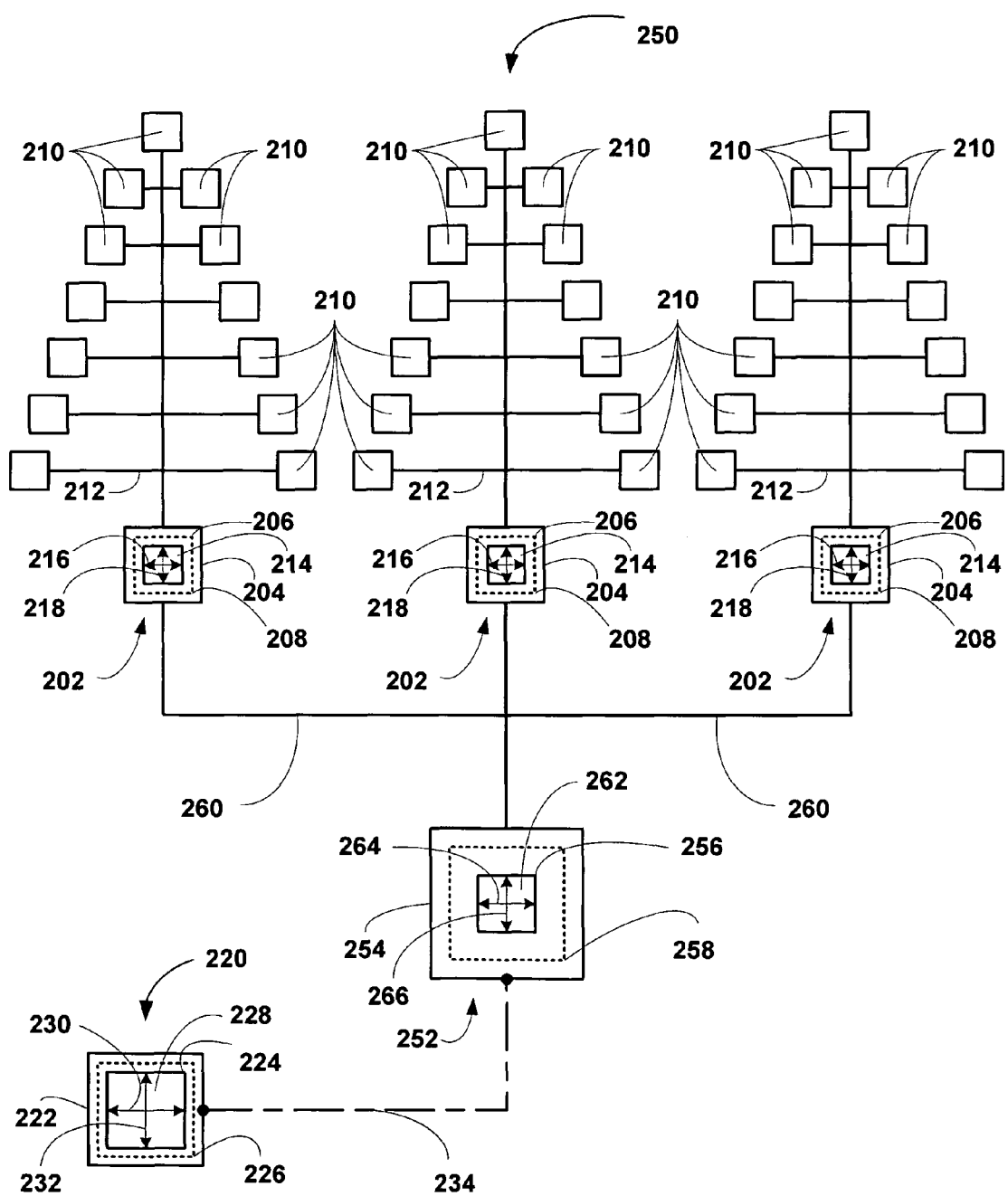
FIG. 2B depicts a preferred embodiment of an electrical device control system of this invention including a central control unit and a plurality of multi-device switches of FIG. 2A.

Referring now to FIG. 2B, another preferred embodiment of an electrical device control system of this invention, generally 250, is shown to include a central control unit 252 having a housing 254 including an user interface 256 and a processing and control unit 258. The central control unit 252 is connected, via electric wires 260 to a plurality of MDSs 202. One of ordinary skill in the art should recognize that wires 260 can be replaced by any other type of wired communication such as optical fiber, coaxial cable, twisted pairs, shielded twisted pairs or the like or any type of wireless communication such as RF, ultrasound, laser, maser, IR, near IR, microwave, or the like. Motion of a body part of a human or animal (not shown) on, about, over and/or near a surface 262 of the interface 256 in a first direction 264 allows the user to scroll through the MDSs 202. Motion of the body part on, about, over and/or near the surface 262 in a second direction 266 allows the user to a scroll through the available electrical devices 210 controlled by the selected switch, which is selected by a scroll position when the body part moves in the second direction 266. Motion for a second time in the first direction 264 allows the user to change a value of an attribute of a selected electrical device, which is selected by a scroll position when the body part stops moving in the second direction 266 and starts moving, for a second time, in the first direction 264. Whether the value of the attribute is increase or decreased depends on whether the body part moves to the right or to the left. Moving to the right, the positive x direction, increases the value of the attribute, while moving to the lift, the negative x direction, decreases the value of the attribute.

As in FIG. 2A, each MDS 202 includes a housing 204 including an user interface 206 and a processing and control unit 208, which allows for independent user interaction with each switch bypassing the central control unit 152. Each MDS 202 controls a plurality of electrical devices 210 connected to the unit 208 by a plurality of electric wires 212. Motion of a body part of a human or animal (not shown) about, over or near a surface 214 of the interface 206 in a first direction 216 allows the user to scroll through the electrical devices 210, and motion of the body part about, over or near the surface 214 in a second direction 218 allows the user to a change of an attribute of a selected electrical device, where the motion in the second direction 218 results in device selection and the direction on motion results in changing the value in a positive or negative direction indicate by the arrows associated with the second direction 218. Of course, an ordinary artisan should recognize that the direction 216 and 218 need not be orthogonal and need not be in an essential x or y direction as shown here.

As in the system 200, the system 250 also includes a handheld or remote control unit 220 having a housing 222 including an user interface 224 and a processing and control unit 226. Motion of a body part of a human or animal or an object under the control of a human or an animal (not shown) on, about, over or near or in proximity to a surface 228 of the interface 224 in a first direction 230 allows the user to scroll through the MDSs 202 as if the interface 256 was being directly activated. Motion of the body part on, about, over or near or in proximity to the surface 228 in a second direction 232 allows the user to scroll through the devices 210 controlled by a selected MDS 202, selected by the change in direction. While, motion in the first direction 230 for a second time, results in a change of a value of an attribute associated with a selected electrical device, selected by the change in direction of motion. The remote unit 220 is in communication with the control unit 252 via the wire-based and/or a wireless communication pathway or link 234.

Although FIGS. 1A & B and 2A & B are shown with either a single MDS and associated devices or a central control unit controlling separate MDSs, each MDSs having associated devices, each MDS does not have to directly control the devices, which may be part of a power bank. Thus, the MDSs can be in electronic communication with the power bank or a computer controlling the power bank, where the MDSs would send command signals to the power bank controller or to a computer controlling the power bank to execute the commands set to it by the user-interface interactions. Moreover, the remote control unit could send its commands to a central computer which would then route the commands to an appropriate MDS, power bank or device. Thus, the interfaces and MDSs of this invention can be integrated into a homes existing computer control and monitoring system, greatly expanding the computer control efficiency and enhancing user friendly interactions.

Illustrative Examples of General User Interfaces of this Invention

Referring now to FIGS. 3A-C, a preferred embodiment of an MDS or control unit, generally 300, of this invention is shown to include a housing 302 including an user interface 304 and a processing and control unit 306. Motion of a body part of a human or animal (not shown) in proximity to a surface 308 of the interface 304 in a first direction 310 allows the user to scroll through a list of items such as devices or MDSs. While motion of the body part in proximity to the surface 308 in a second direction 312 allows the user to either scroll through another list of items or to affect a change in a value of an attribute associated with a device. Motion in the first direction 310 for a second time, would allows the user to either scroll through another list of items or to affect a change in a value of an attribute associated with a device, and so on. The interface 304 is in communication with the control unit 306 via a communication pathway 314, and the control unit 306 is in communication with MDSs or devices via communication pathway 316. The pathways 314 and 316 can be wire-based or wireless depending on design criteria. In this embodiment, the user interface 314 is a relatively small device that senses motion proximate to the device. Such devices include optical devices such as those devices used in optical mouse devices manufacture by MicroSoft Corporation and others. In fact, on such device is simply a mouse that is turned over and the optical plane slightly realigned.

Referring now to FIGS. 3D-F, another preferred embodiment of an MDS or control unit, generally 300, of this invention is shown to include a housing 302 including an user interface 304 and a processing and control unit 306. Motion of a body part of a human or animal (not shown) in contact with or in proximity to a surface 308 of the interface 304 in a first direction 310 allows the user to scroll through a list of items such as devices or MDSs. While motion of the body part in proximity to the surface 308 in a second direction 312 allows the user to either scroll through another list of items or to affect a change in a value of an attribute associated with a device. Motion in the first direction 310 for a second time, would allows the user to either scroll through another list of items or to affect a change in a value of an attribute associated with a device, and so on. The interface 304 is in communication with the control unit 306 via a communication pathway 314, and the control unit 306 is in communication with MDSs or devices via communication pathway 316. The pathways 314 and 316 can be wire-based or wireless depending on design criteria. In this embodiment, the user interface 304 is larger than the interface of FIGS. 3A-C, an sensing motion over its surface 308, either by direct contract, e.g., a mouse pad, or with or without direct contact, e.g., a device sensitive to changes in impedance on the surface 308. Impedance based devices can look at impedance, inductance, or capacitance to determine the area of contact, where direction is determine by following the motion and converting the motion into a motion direction.

Referring now to FIGS. 3G-I, another preferred embodiment of an MDS or control unit, generally 300, of this invention is shown to include a housing 302 including an user interface 304 and a processing and control unit 306. Motion of a body part of a human or animal (not shown) in contact with or in proximity to a surface 308 of the interface 304 in a first direction 310 allows the user to scroll through a list of items such as devices or MDSs. While motion of the body part in proximity to the surface 308 in a second direction 312 allows the user to either scroll through another list of items or to affect a change in a value of an attribute associated with a device. Motion in the first direction 310 for a second time, would allows the user to either scroll through another list of items or to affect a change in a value of an attribute associated with a device, and so on. The interface 304 is in communication with the control unit 306 via a communication pathway 314, and the control unit 306 is in communication with MDSs or devices via communication pathway 316. The pathways 314 and 316 can be wire-based or wireless depending on design criteria. In this embodiment, the user interface 304 is larger than the interface of FIGS. 3A-C, an sensing motion over its surface 308, either by direct contract or proximity to the surface 308. Unlike the interface of FIGS. 3D-F, the interfaces of these figures, are matrix devices including a large number of sensing elements 318. Each element 318 having an ON state and an OFF state to determine whether motion has occurred and if so in what direction.

Figure 4A:
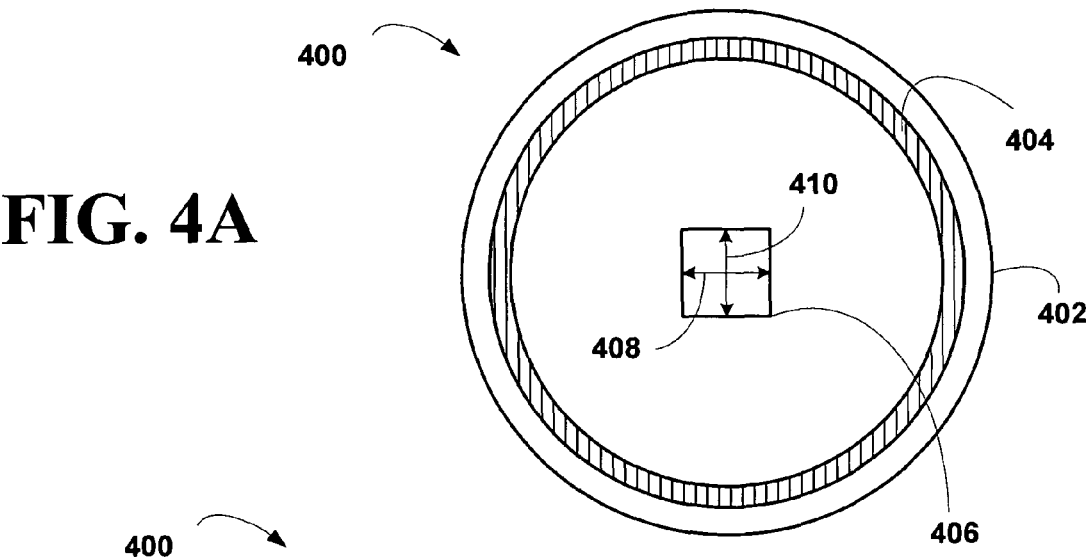
FIGS. 4A-C depict plan views of three preferred embodiments of an user interface of the present invention including a motion sensor and active ring.
Figure 4B:
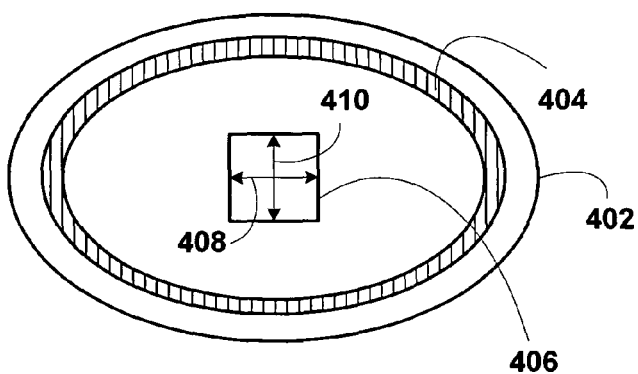
Figure 4C:
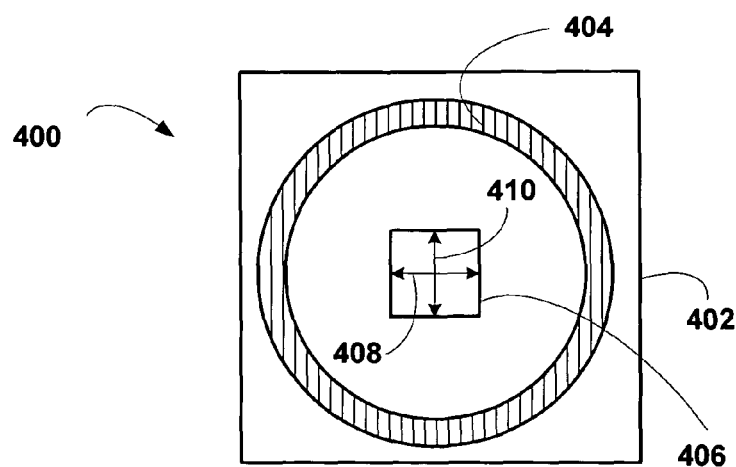

Referring now to FIGS. 4A-C, three preferred embodiments of an interface, generally 400, of the present invention is shown to include a housing 402, a selection ring 404 and a motion detector 406 able to discern motion in an x direction 408 and a y direction 410. The ring 404 is touch sensitive or active. The ring 404 can includes discrete positions corresponding to each device or MDS controllable by the interface, or moving a body part over the ring in a clockwise or counterclockwise direction could result in list scrolling.

Figure 5A:
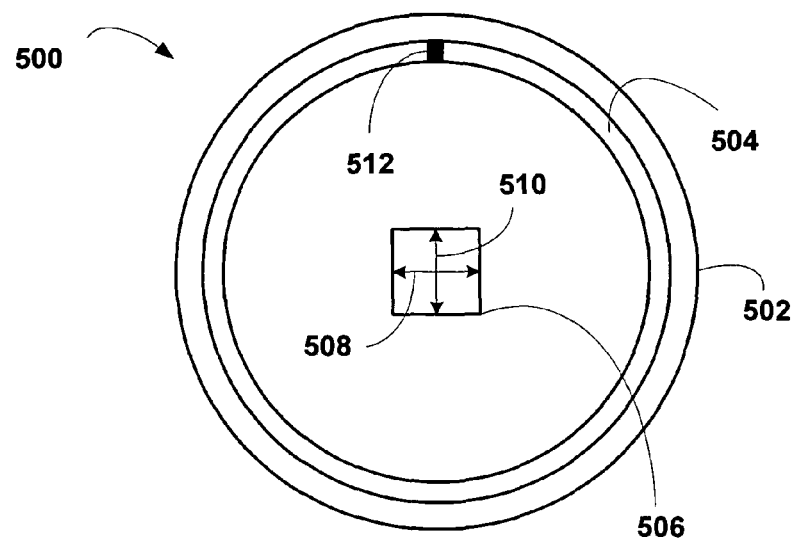
FIGS. 5A-C depict plan views of three preferred embodiments of an user interface of the present invention including a motion sensor and movable ring.
Figure 5B:
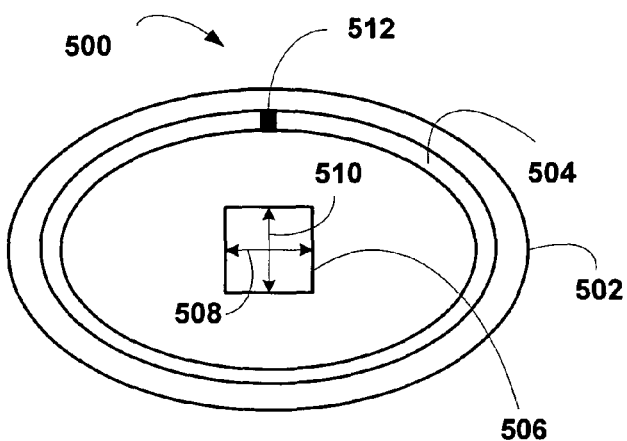
Figure 5C:
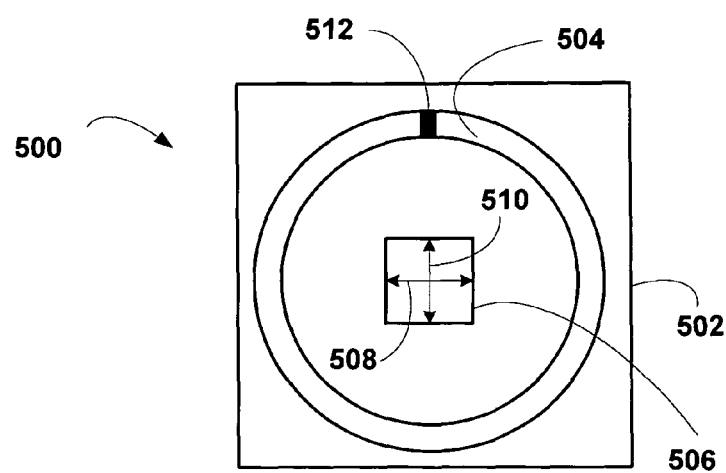

Referring now to FIGS. 5A-C, three other preferred embodiments of an interface, generally 500, of the present invention is shown to include a housing 502, a selection ring 504 and a motion detector 506 able to discern motion in an x direction 508 and a y direction 510. The ring 504 is a slidable ring including a slide nob 512, where the location of the nob 512 corresponds to a device or MDS controllable by the interface.

Figure 6A:
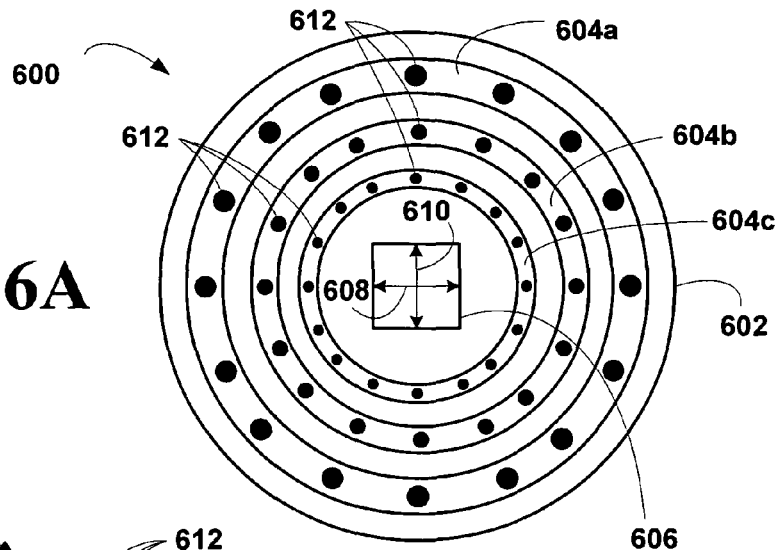
FIG. 6A-C depict plan views of three preferred embodiments of an user interface of the present invention including a motion sensor and a plurality of concentric active ring areas or movable rings.
Figure 6B:
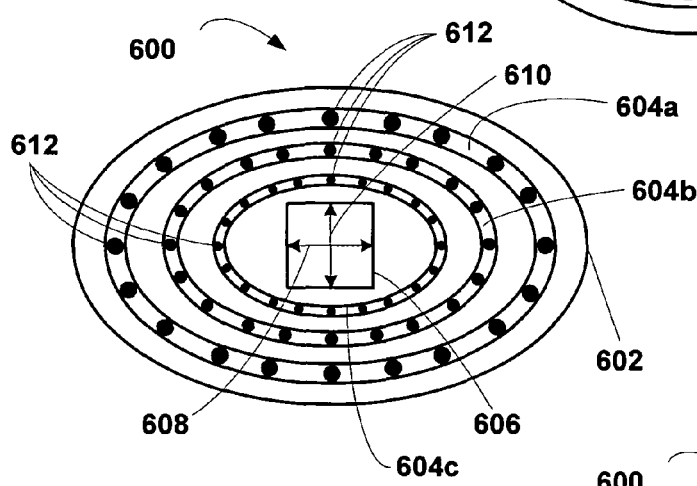
Figure 6C:
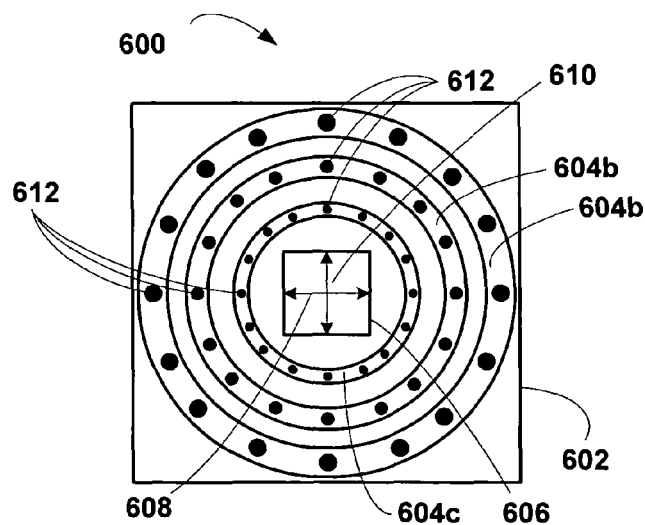

Referring now to FIGS. 6A-C, three other preferred embodiments of an interface, generally 600, of the present invention is shown to include a housing 602, three selection rings 604a-c and a motion detector 606 able to discern motion in an x direction 608 and a y direction 610. Each ring 604a-c including a plurality of selection buttons 612, where each button 612 corresponds to a device or MDS controllable by the interface.

Figure 7:
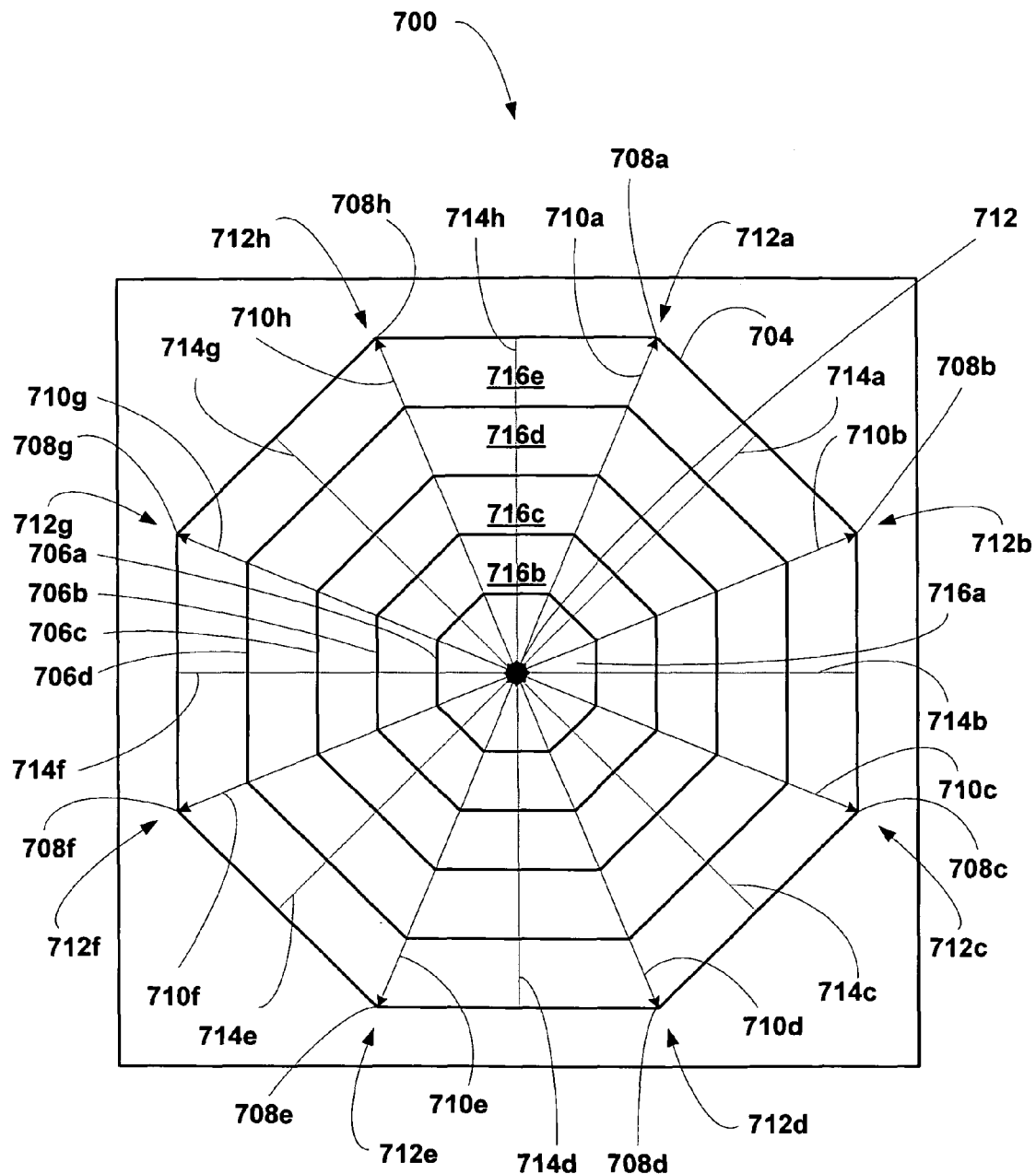
FIG. 7 depicts a top view of another preferred embodiment of an user interface of the present invention including multi-directional motion sensing and concentric active areas.

Referring now to FIG. 7, another preferred embodiments of an interface, generally 700, of the present invention is shown to include a housing 702, a physical or computer generated polygon outer octagon 704, and physical or computer generated inner concentric octagons 706a-d. Each vertex 708a-h of the octagon 704 corresponds to one of eight devices (not shown) controllable by the interface 700. Motion along lines 710a-h or within sector 712a-h defined by adjacent dashed lines 714a-h including each line 710a-h, changes a value of an attribute of the devices corresponding to the vertices 704. Concentric areas 716a-e correspond to a given attribute value. Having moved a body part from a center position 718 of the interface 700 in the direction of vertex 708a to concentric area or zone 716c, and then moving the body part clockwise or counterclockwise within the area 716c, immediately sets each corresponding device to the same attribute value for the zone 716c or a proportional value corresponding to the area or zone 716c. That is, if one device has an attribute value range of 0 to 100, while another has an attribute value range of 0 to 500, the adjustment of the two devices would be proportional to the range.

All of the illustrative examples of interfaces of this invention can also include user feedback devices to indicated which item in a selection list is being selected. The feedback devices can be any devices for identifying to the user the items in a list in a unique manner. Such devices can by visual, acoustic, or tactile or mixtures thereof. Thus, the interface can include a display device which would display a word, phrase, icon or the like to identify the item during a scrolling operation and to continuously display the item when it is selected. The display could then include a range indicator for attribute values which would change in response to movement by the user, e.g, a volume indicator for a speaker, water temperature indicator for showers or the like. The feedback device could also be a sound generator which could state the devices during a scrolling operation and then state the name of the device selected and the direction of attribute value change. The feedback device could also emit a sound code, optical code or tactile code unique for each item in a list and a unique code to indicate the item during a scrolling operation or to identify a selection and to identify the direction of change of an attribute value. Such feedback devices can be tailored to users with different and special needs such as the blind, deaf, or the like.

The interfaces of this invention can also be made air tight and/or water tight so that the devices can be used in clean room environment or in areas that get wet such as showers, baths, or the like or underwater such as in pools, hot tubes or the like. The interfaces can be made so that they can be routinely sterilized or disinfected, provided, of course, that the sterilization conditions do not adversely harm the electronic components in the interface.

Illustration of List Selection and Attribute Selection and/or Control

Referring now to FIGS. 8A-G, the method of operation of an interface, generally 800, of the present invention is shown. Looking a FIG. 8A, the interface 800 is shown in its initial or inactive state (no motion of a body part in contact with or proximity to the interface has been detected) and a selection list 802 associated with the interface is shown below the interface 800 and includes device indicator boxes 804 for pictorial representation of the list, which may only exist in computer memory. Of course, the list 802 and boxes 804 could appear in a display associated with the interface (not shown). The list 802 is shown in an initial state, where an active box 806 represents active device, and here is the first box in the list. Looking a FIG. 8B, the interface 800 has detected motion in a positive x direction indicated by the arrow headed line segment 808 and the interface responses by scrolling through the list 802 one box 804 at a time. Motion in the positive x direction has caused the active box 806 to change by one position. Looking at FIG. 8C, the interface 800 has continued to detect motion in the positive x direction, causing further scrolling through the list 802 and changing the active box 806. Looking a FIG. 8D, the interface 800 has continued to detect motion in the positive x direction, causing further scrolling through the list 802 and changing the active box 806 to the last box in the list 802. If the user where now to move a body part in the negative x direction, then the scrolling would proceed from the last box in the list to the first box in the list. Moreover, the initial state of the list when motion is detected can be anywhere in the list.

Figure 8E:
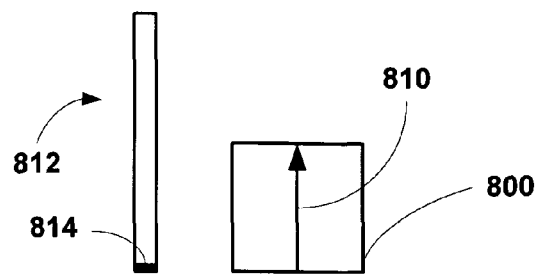
FIGS. 8E-G depict selecting from the list and simultaneously changing a value of an attribute by changing the direction of the sensed motion.
Figure 8F:
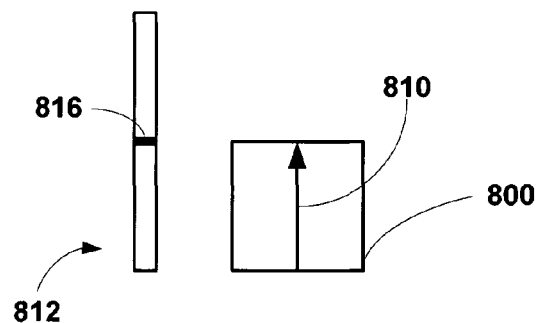
Figure 8G:
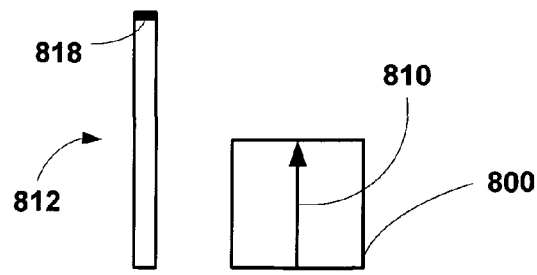

Looking at FIGS. 8C and 8E, the interface 800 has detected motion in the positive y direction indicated by the arrow headed line segment 810 and the interface responses by activating the device represented by the active box 806. Motion in the positive y direction will cause a change in the value of an active attribute of the activated device depicted here by a value gauge 812. Again, the gauge can exist only in a computer memory or may be displayed in a display associated with the interface 800. For single attribute devices such as lights, motion in the y direction control the value of the attribute, such as the output of a light. As shown in FIG. 8E, the attribute value is at its minimum position 814. Looking a FIG. 8F, the interface 800 continues to detect motion in the positive y direction causing the attribute value to change from its minimum position 814 to an active position 816, shown here at the mid point of the value range indicated by the gauge 812. If the user stopped the motion in the positive y direction, then the device attribute would be at ½ is maximum value. Looking a FIG. 8G, the interface 800 continues to detect motion in the positive y direction causing the attribute value to change to a new active position 818, shown here at the maximum value of the value range indicated by the gauge 812. Again, motion in the negative y direction will result in a decrease in the value of the attribute. For system of this invention having multiple selection lists, then changing to motion in the y direction would activate a sublist, and changing to motion in the x direction would either drill down or up the selection lists hierarchy. Of course, drilling down would eventually get the user to an attribute control functionality as shown in FIGS. 8E-G, which could be a y or x motion. Moreover, drilling up would eventually get the user to the top level list. Alternatively, list drilling could be achieve by activating the interface and then holding the body part still for a set time prior to resuming motion. The pause would cause the software to transition either up or down a list hierarchy.

Specific Embodiments of Control Systems of this Invention

Figure 9A:
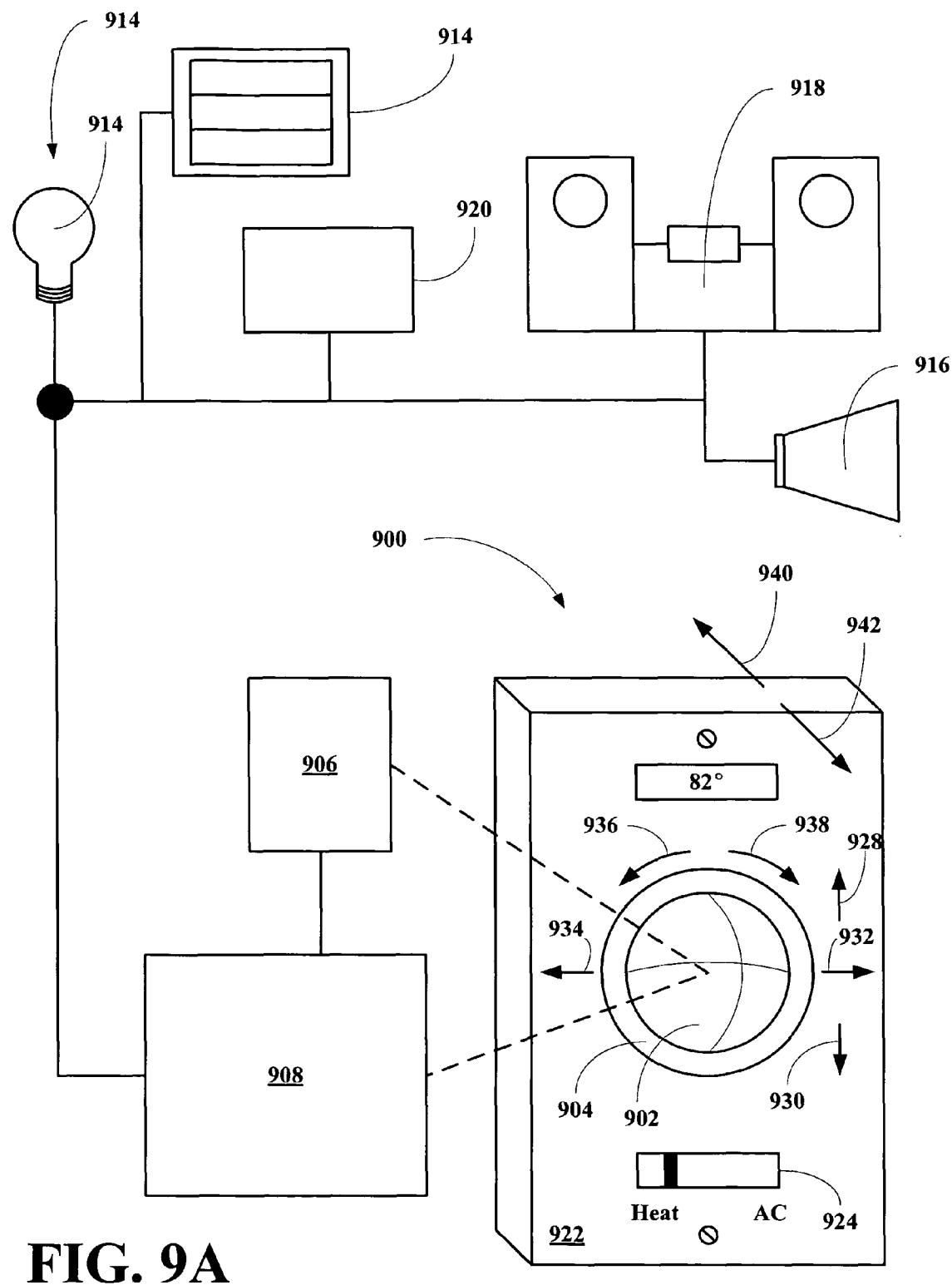
FIG. 9A depicts a schematic view of a preferred embodiment of the invention illustrated in FIG. 1.

Referring now to FIG. 9A, a preferred embodiment of an electric switch apparatus 900 of the present invention includes at least one movement sensitive form 902 and a housing 904 conformed to receive and retain the movement sensitive form 902. An optical sensor 906 is conformed to receive physical movement signals from the movement sensitive form 902 and convert the physical movement signals into input control signals, as will be discussed more fully hereafter. A digital processing unit (DPU) or microprocessor 908 is connected to the optical sensor 906 and converts input control signals to output control signals. At least one independent electrical device 910 is connected to or in control communication with the microprocessor 908.

The independent electrical device 910 may take the form of any electrical device now known or hereafter developed. In particular, the independent electrical device 910 may be a lighting device 912, a motion device 914, a security control device 916, a sound device 918, and/or a temperature control device 920. For the purpose of explanation and not by way of limitation, the lighting device 912 may be a lamp, the motion device 914 may be louvers on an AC vent and/or window blinds, the security control device 916 may be a household alarm, the sound device 918 may be a stereo system, and the temperature control device 920 may be a heating and air-conditioning unit, for example.

Still referring to FIG. 9, the embodiment of the invention illustrated discloses electrical switch apparatus 900 conformed to control the temperature control device 920. In this embodiment, a face plate 922 provides user controls as known in the art. That is, a soft switch, a button, an active area or a manual heat/cool switch 924 is provided so that the user may choose between heating and cooling. Also, the room temperature is indicated in a temperature display device 926.

In use, movement sensitive form 902, in this instance in the form of a sphere, is rotated in the direction of up arrow 928 to raise the temperature and toward down arrow 930 to lower the temperature. The physical movement of movable form 902 is sensed by optical sensor 906 and converted to input control signals. In another form of the invention, movement sensitive form 902 is a stationary form of any shape, flat, spherical or other, and it receives and transfers the movement of a user about the movement sensitive form 902 to the optical sensor 906. In either case, these input control signals are sent to microprocessor 908 where they are converted to output control signals. These output control signals are then sent to temperature control device 920 in a manner corresponding to the user's desired result.

In one aspect of the invention, movement of rotationally movable movement sensitive form 902 in one direction, for example in the direction of direction arrow 932 or direction arrow 934, results in the creation of output control signals at microprocessor 908 for the selection of one of a plurality of independent electrical devices 910. For example, temperature display device 926, in this embodiment, displays which particular independent electrical device 910 has been selected by the movement of rotationally movable form 902 in the direction of either arrow 932 or 934.

Once the desired independent electrical device 910 has been selected, the user moves movable form 902 in the direction of up arrow 928 or down the arrow 930 to achieve the desired result. It should be noted, that the most basic desired result is simply to manipulate one or more of the independent electrical devices 910 illustrated by turning them "ON". As previously disclosed, the electrical switch 900 of the present invention does not involve the mechanical movement of the on-off switch as is now known in the prior art. Instead, as illustrated in *FIG. 18*, the electrical switch 900 of the present invention is always directly connected to the independent electrical devices 910 but by the control provided by microprocessor 908 only when a particular electrical device 910 is selected for manipulation by a user is enough current allowed to flow so as to effect actuation of the device.

In another aspect of the invention, once the desired independent electrical device 910 has been selected and turned on, continued movement of rotationally movable form 902 provides variable control of the selected independent electrical device 910. That is to say, the lights can be dimmed, the shades lowered, the sound raised, the temperature lowered, the alarm turned down and so forth. In a further aspect of the invention, output signals for this variable control continue as long as movement of the rotationally movable form 902 continues until normal upper and lower stop limits are reached for the selected independent electrical device 910. Again, it should be noted that in a preferred embodiment, movement sensitive form 902 is stationary and simply transmits the movement of the user "about its form" to the optical sensor 906. In this regard, it should also be noted that the term "about its form" includes movement that is "touchless" in which the user does not have to make contact with movement sensitive form 902 and includes physical movement and touching of a stationary movement sensitive form 902.

In a further aspect of the invention, where, for example, a single independent electrical device 910 is connected to electrical switch apparatus 900, movement of rotationally movable form 902 in the direction of arrow 932 or arrow 934 turns the device on or off, as that term is used herein. In this embodiment, thereafter, movement of rotationally movable form 902 in the direction of up arrow 928 or down the arrow 930 provides for variable control of the independent electrical device 910 to brighten or dim it as desired.

In another aspect of the invention, housing 904 is moveable in the direction of arrows 936 and 938 such that the movement of housing 904 enables a user to select a particular independent electrical device 910 from a plurality of the independent electrical devices 910 connected to microprocessor 908. In this embodiment, thereafter movement sensitive form 902 is used to activate the selected independent electrical device 910 and/or variably control the operation of the selected electrical device 910 as discussed above.

In a further aspect of the invention, movement sensitive form 902 is in the form of a sphere as illustrated in the figures. Certainly, any desired, convenient, aesthetically pleasing form is well within the scope of the invention. In a further aspect of the invention, movement sensitive form 902 is lighted. Lighting may be provided by any means now known or hereafter developed and may serve the function of a night light, for example. In another aspect of the invention, movement sensitive form 902 is filled with fluid with suspended material. In yet another aspect of the invention, housing 904 is conformed to allow movement sensitive form 902 to move in and out in the direction of arrows 940 and 942. The movement of movement sensitive form 902 in the direction of arrows 940 and/or 942 may serve the purpose of selecting desired independent electrical devices 910 and/or once the desired independent electrical device 910 is selected, acting to turn the device on and off, leaving variable control of the operation of the device to movement about the movement sensitive form 902 in the direction of arrows 928 and 930, for example.

Optical sensor 906 may take the form of any known optical sensor or any optical sensor hereafter developed. For example the optical sensor sold by Agilent Technologies under the brand-name HDNS-2000 is an acceptable optical sensor for the purposes of the present invention. Further, other sensors may be utilized other than optical so long as the objects of the invention are achieved. Additionally, microprocessor 908 is any microprocessor/state machine controller capable of controlling an AC voltage source magnitude to multiple groups of AC power apparatus. In the case of the present invention, the input control signals to the microprocessor 908 are generated by the optical sensor 906 which detects the physical movement about movement sensitive form 902 and converts the movement into quadrature signals proportional to the movement. A wide variety of useful embodiments are within the ordinary skill levels of those in the art. For example, as discussed above, microprocessor 908, in one aspect of the invention, detects two types of input quadrature signals for user control. The first signal determines which group of independent electrical devices 910 is to be controlled. The second signal determines the voltage magnitude applied to the selected independent electrical device 910, thus providing variable control. A suitable microprocessor 908 is the Z8EO01100PEC brand integrated circuit microprocessor developed by the Zilog Company of California.

Microprocessor 908, in a further embodiment, receives input signals from RS232 or PS/2 devices. In this implementation, microprocessor 908 communicates with the RS232 or PS/2 serial device control circuit. It should be noted as a further aspect of the present invention, that the input signal may be generated from the detection of the movement about movement sensitive form 902 in the form of physical movement of the form or the detection of movement by means of visual or infrared light, heat, pressure, optical, magnetic flux, electrostatic field, and/or vibration detection circuits.

Figure 9B:
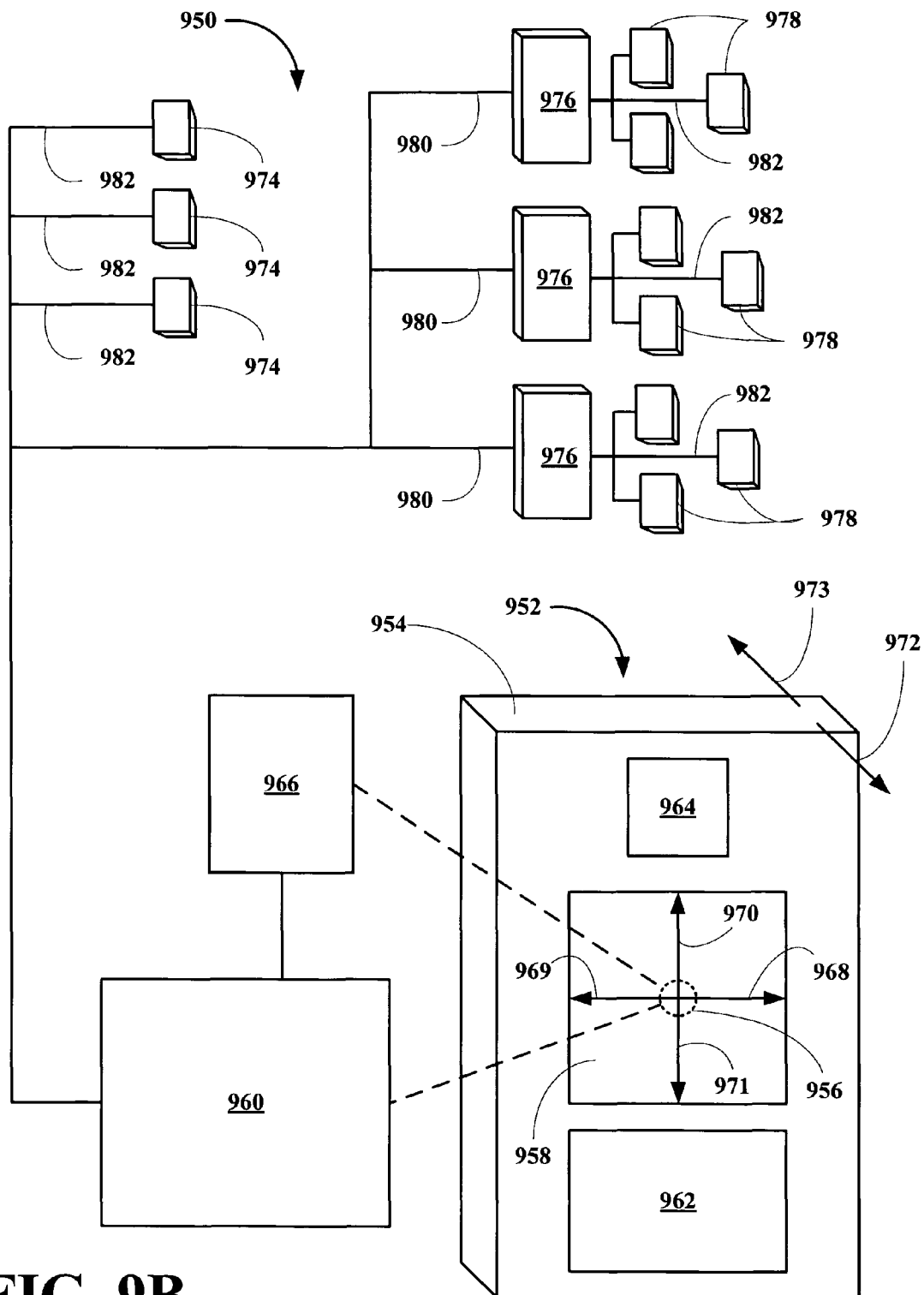
FIG. 9B depicts a schematic view of a preferred embodiment of the invention illustrated in FIG. 1.

Referring now to FIG. 9B, another preferred embodiment of an electric switch apparatus 950 of the present invention includes a control unit 952 comprising a housing 954, an optical sensor 956 place behind a clear plexiglass cover 958, a processing unit 960 (preferably a DPU), a display unit 962 and a security finger print sensor 964. The control unit 952 can be handheld or mounted on a wall, on the surface of a desk or counter or on or in any other fixture or object. The optical sensor 956 in conjunction with its associated microprocessor 966 converts physical movement into output signals to the processing unit 960 which uses the sensed motion to activate list (menu) scroll functions or activate attribute change functions. The processing unit 960 also sends output signals to the display 962 so that the user will know what action is being performed (list scrolling or device attribute control). The processing unit 960 also receives output from the finger print sensor 964, which is used to verify user authorization to use the apparatus 950. The optical sensor 956 comprises an HP optical sensor used in its optical mouses and is capable of detecting motion at a given focal plane at or above the surface of the plexiglass cover 958. For simplicities sake, motion in three direction are indicated: motion in a positive x direction 968, in a negative x direction 969, in a positive y direction 970, in a negative y direction 971, in a positive z direction 972, and in a negative z direction 973, where motion in the z directions, 972 and 973, are associated with moving in or out of the active zone of the optical sensor 956. The control unit 950 can either be connected direction to a plurality of devices 974, a plurality of multi-device switches 976, which are in turn connected to a plurality of devices 978 or to a mixture of devices 974 and multi-device switches 976 with their associated devices 978. The multi-device switches 976 can be identical to the control unit 950 or can be a simplified version thereof lacking the user interface, display and/or finger print sensor. Of course, the switches 976 must be in communication with the control unit 950 either via wired communication links or wireless communication links 980. Moreover, the control unit 950 or the switches 976 must be connected to the electrical devices 976 and 978 in such as way that they can turn the device on and off and vary any attribute associated with the devices for the attributes full range via links 982. Furthermore, the apparatus 950 can include remote control devices as described in FIGS. 1, 2, and 11-13.

Illustrative Examples of User Interfaces of this Invention

Figure 10A:
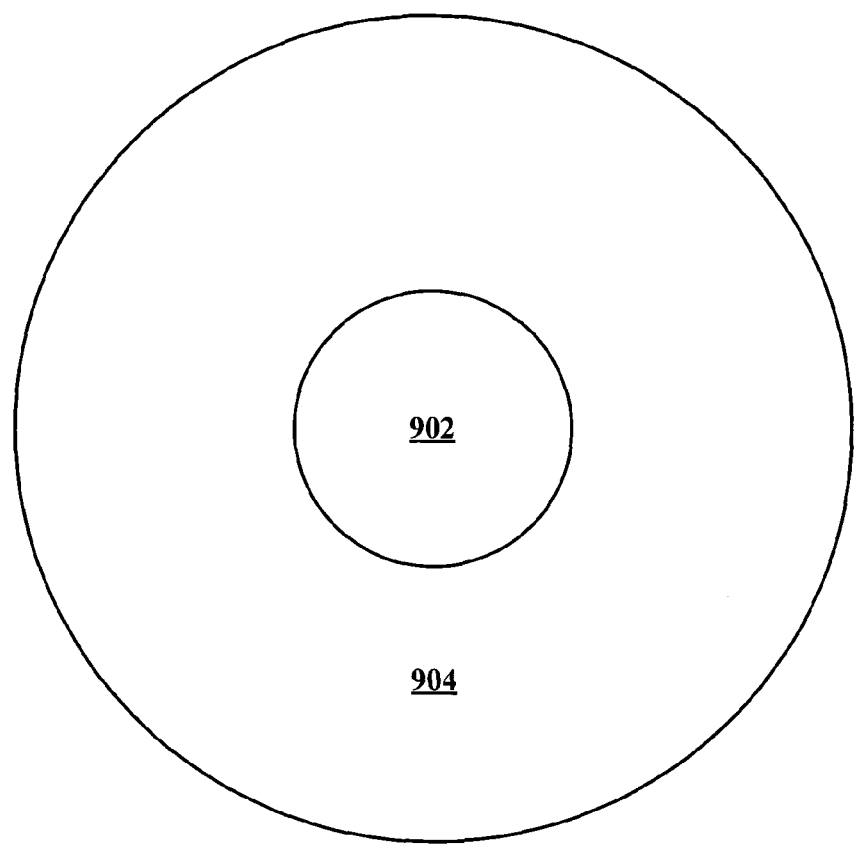
FIGS. 10A-B depict a top and side view of another preferred embodiment an user interface or switch with user interface of FIG. 9.

The next series of drawings depict a variety of combinations of user interface designs and constructions for use in this invention. Looking at FIGS. 10A and B, the housing 904 is disk shaped and the movement sensitive form 902 is a rotatable sphere or ball. Looking at FIGS. 11A and B, the housing 904 is a five pointed star shape and the movement sensitive form 902 is a rotatable sphere or ball having a central region 903 adapted to receive a logo such as the seal of a state, a corporate logo or the like. Looking at FIGS. 12A and B, the housing 904 is a multi-pointed shape rotatable around a base 905 and the movement sensitive form 902 is a rotatable hemisphere.

Figure 10B:
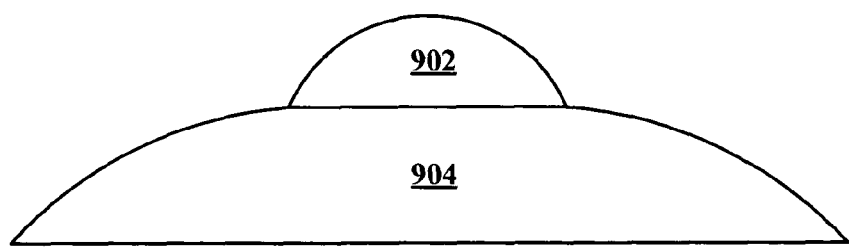
Figure 11A:
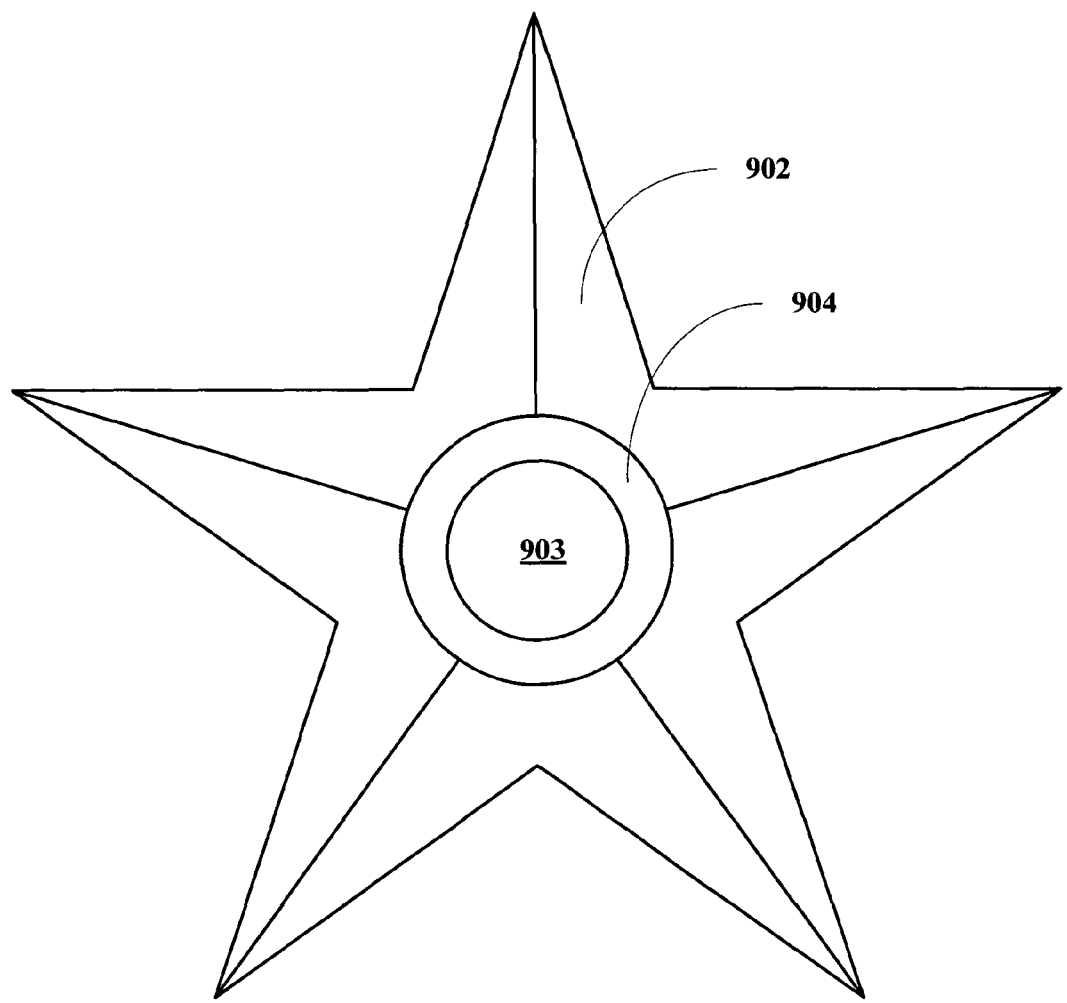
FIGS. 11A-B depicts a top and side view of another preferred embodiment an user interface or switch with user interface of FIG. 9.
Figure 11B:
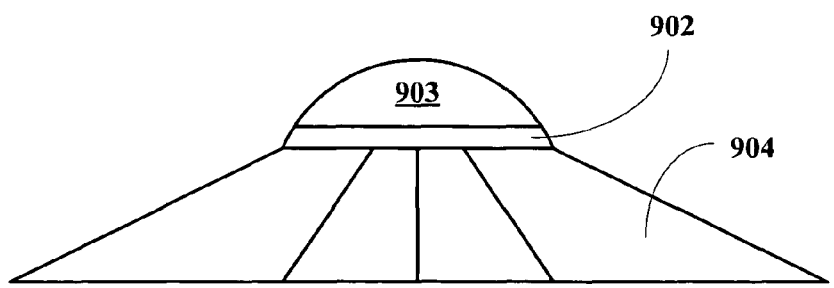
Figure 12A:
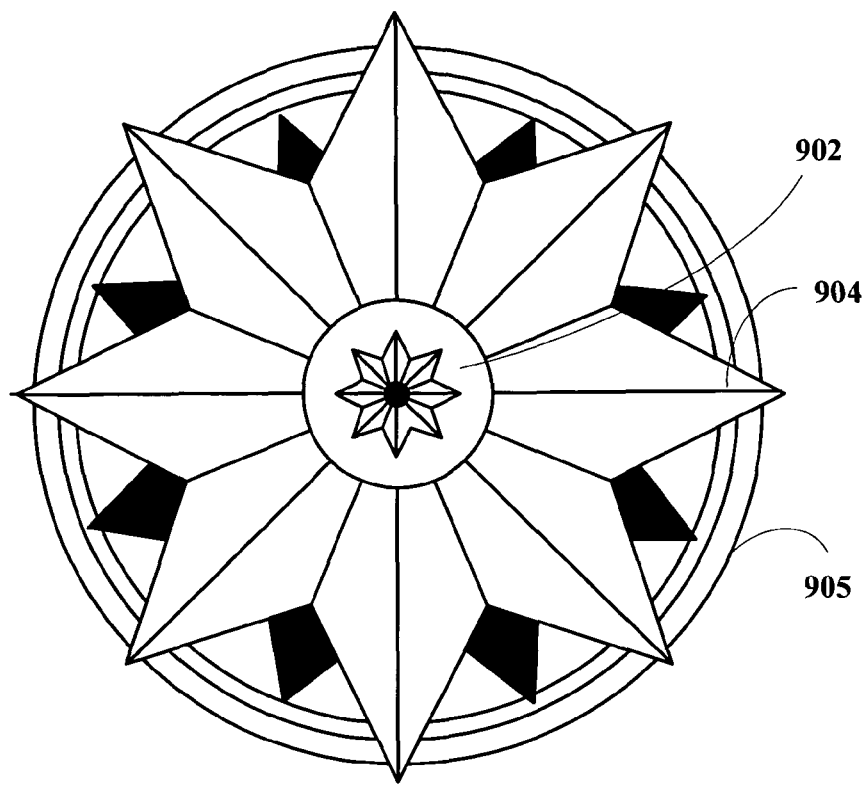
FIGS. 12A-B depicts a top and side view of another preferred embodiment an user interface or switch with user interface of FIG. 9.
Figure 12B:
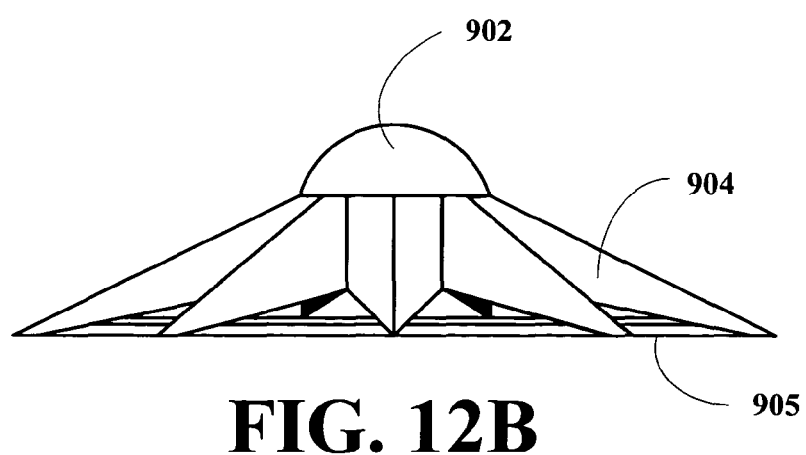
Figure 13A:
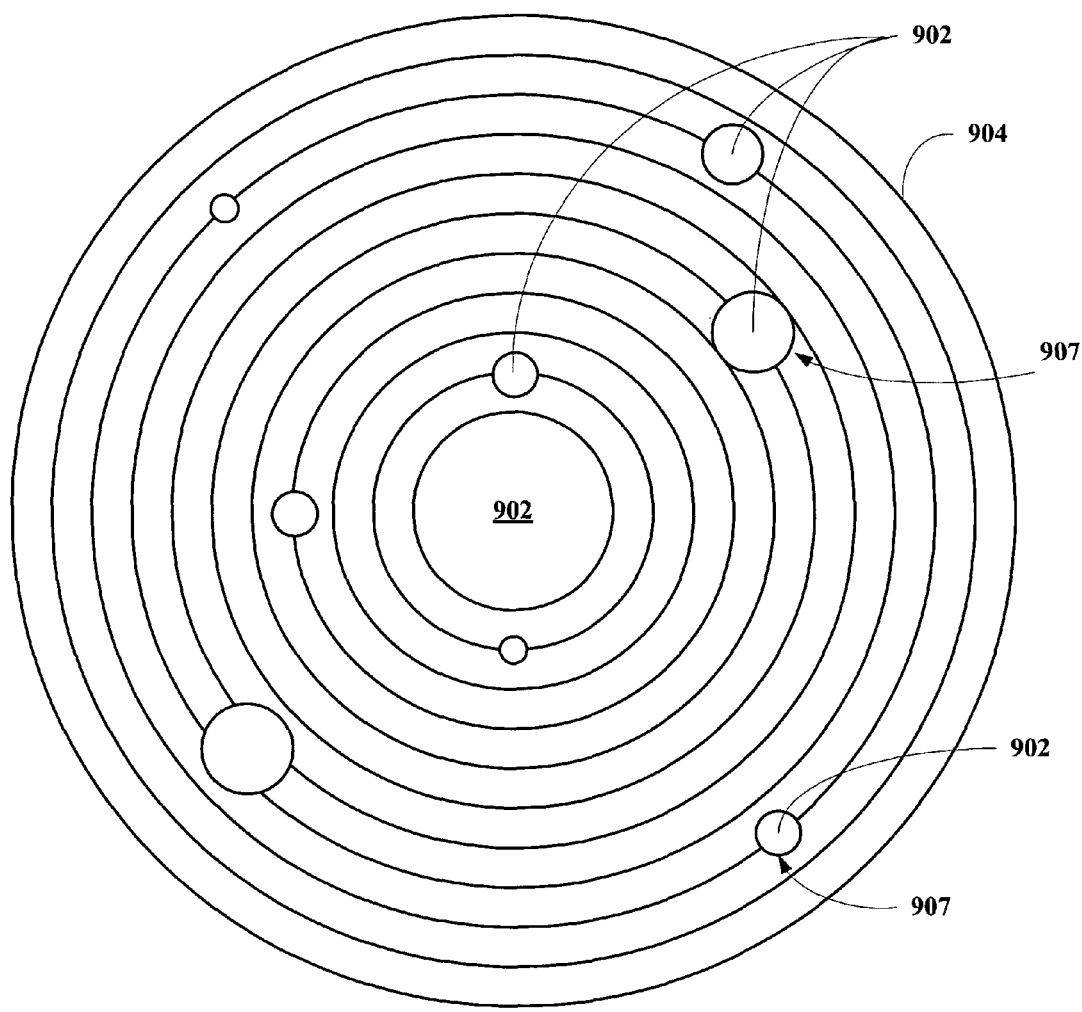
FIGS. 13A-B depicts a top and side view of another preferred embodiment an user interface or switch with user interface of FIG. 9.
Figure 13B:
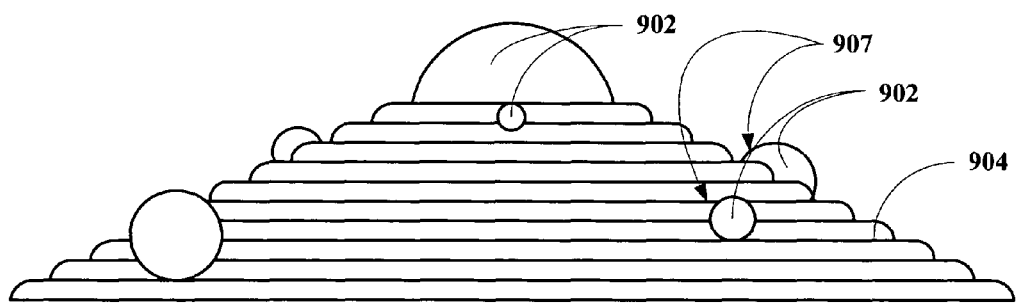

Referring now to FIGS. 13A and B, another preferred embodiment of an apparatus of this invention is shown to include multiple movement sensitive forms 902 in conforming retainers 907 in a housing 904. In this aspect of the invention, literally the whole universe of electrical devices 910 may be encompassed within a single electrical switch apparatus 900. The importance or function of the electrical device 910 may be represented by the size of the movement sensitive form 902 in relation to the whole "planetary" system. Certainly, multiple electrical switch apparatuses 900 disclosed in FIGS. 10 through 12 may be utilized to provide room wide control of all the independent electrical devices 910 in a single room, for example, under control of a central control interface.

Figure 14A:
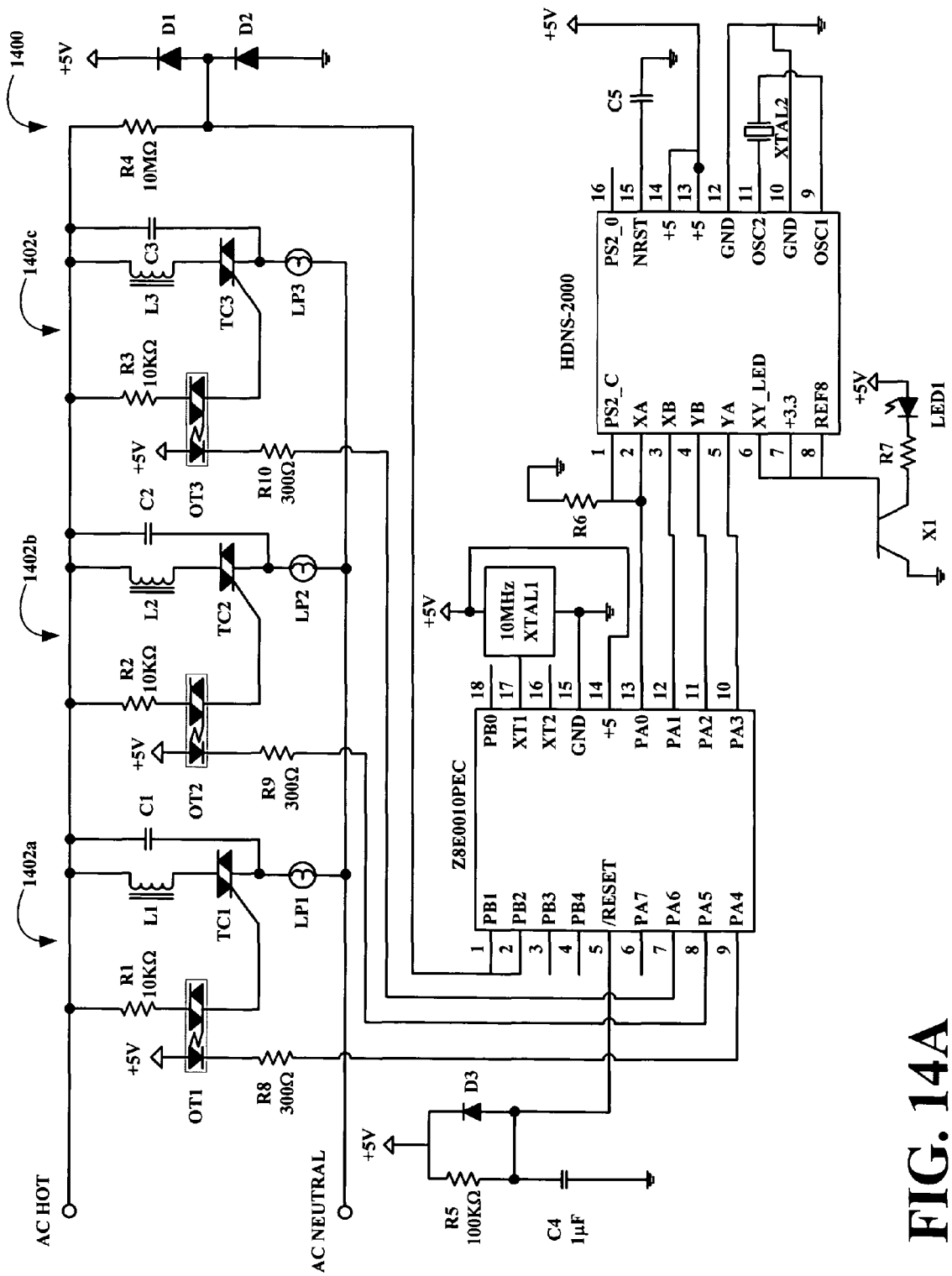
FIG. 14A depicts a circuit diagram of a preferred electrical switch apparatus of the present invention.

Electronic Construction of Circuits of Preferred Embodiment of the MDSs of this Invention Referring now to FIG. 14A, a circuit diagram 1400 of a preferred embodiment of an electrical switch apparatus 900 (FIG. 9) of the present invention is shown. With reference to the circuit diagram, components D1, D2, and R4 create a 60 Hz square wave used to synchronize the microcontroller to power line frequency via a port PB2. The circuit diagram 1400 includes three identical load circuits 1402a-c, only one of which will be described. R8 and OT1 provide an isolated command signal to trigger triac TC1, which allows current flow to a load LP1 shown here as a lamp. A low signal from PA4 signals the light to turn on. Inductor L1 and capacitor C1 provide surge limiting and EMI filtering and R1 places a balancing load across OT1. L1 reduces current surge and C1 reduces electromagnetic emissions (EMI). While the load LP1 is a resistive lamp type device, i.e., a light, but can be any other appliance which requires electric energy to power and can be controlled by changing either the voltage and/or current being supplied to the appliance.

Components R5, C4 and D3 provide a power-on reset for the Z8 CPU. A crystal XTAL1 sets the Z8 CPU to run at a precise frequency. This frequency is used by the phase control algorithm to vary the amount of time that electricity is allowed to flow to an appliance and thereby to increase or decrease current flow to an associated device such as brighten or dimming a light.

The Z8E0010PEC is a simple microprocessor used to control the lamps and interpret command signals. The HDNS-2000 is a motion sensor used for rotary or translational inputs. Components R7, X1 and LED1 provide light necessary for the HDNS-2000. R6 is a pull down resister which indicates that the HDNS-2000 should operate in quadrature output mode, as opposed to PS/2 mode. C5 provides a power-on reset for the HDNS-2000, while XTAL2 sets the master clock for the HDNS-2000.

Figure 14B:
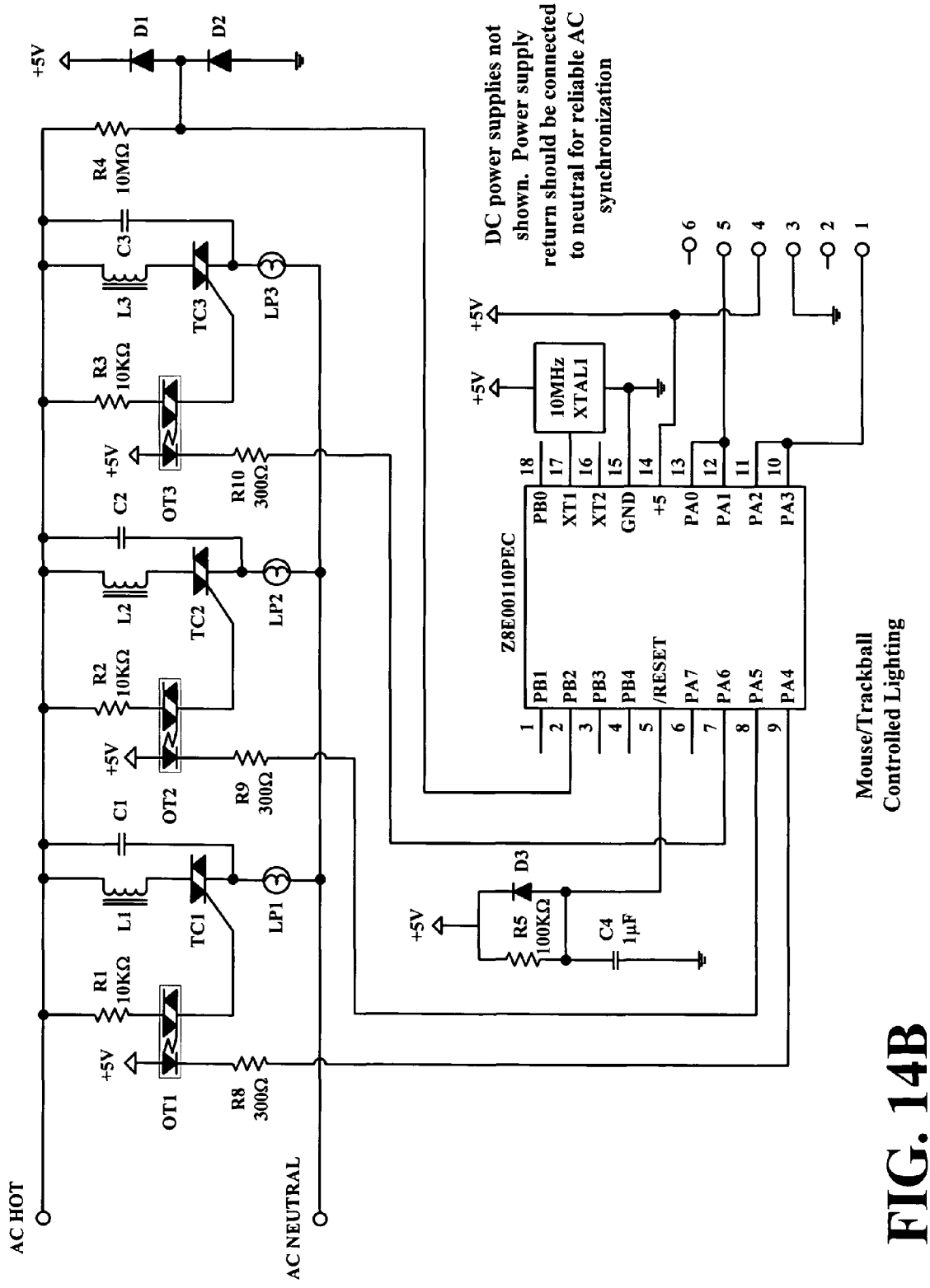
FIG. 14B depicts a circuit diagram of another preferred electrical switch apparatus of the present invention.

Referring now to FIG. 14B, a circuit diagram of another preferred embodiment of an electrical switch apparatus 900 (FIG. 9) of the present invention is shown. With reference to the circuit, components D1, D2, and R4 create a 60 Hz square wave used to synchronize the micro controller to power line frequency via port PB2. In the figure, three identical load circuits are shown. For simplicity, only one will be described. R8 and OT1 provide an isolated command signal to trigger triac TC1, which allows current flow to a load LP1. A low signal from PA4 signals the light to turn on. Inductor L1 and capacitor C1 provide surge limiting and EMI filtering and R1 places a balancing load across OT1. L1 reduces current surge and C1 reduces electromagnetic emissions (EMI). The load LP1 is shown here as a resistive lamp device, i.e., an electric light, but the load LP1 can be any other electric device.

Components R5, C4 and D3 provide a power-on reset for the Z8 CPU. Crystal XTAL1 sets the CPU to run at a precise frequency, shown here as 100 MHz. This frequency is used by the phase control algorithm to vary the amount of time that electricity is allowed to flow to an appliance and thereby to brighten and dim the associated appliance. Again, the Z8E0010PEC is a simple microprocessor used to control the lamps and interpret command signals.

Figure 14C:
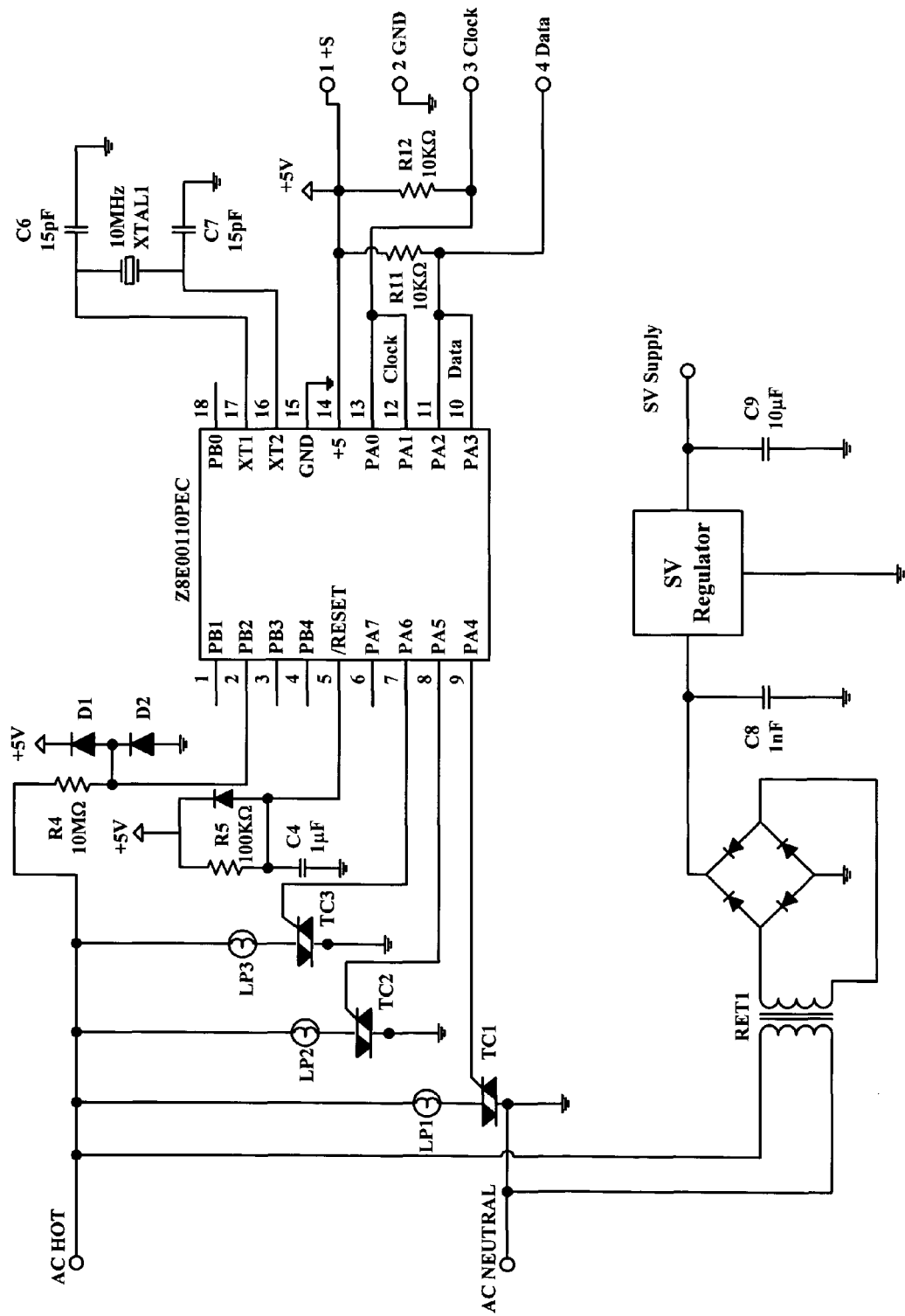
FIG. 14C depicts a circuit diagram of another preferred electrical switch apparatus of the present invention.

Referring now to FIG. 14C, a circuit diagram of another preferred embodiment of an electrical switch apparatus 900 (FIG. 9) of the present invention is shown, without an optical isolator. With reference to the circuit, components D1, D2, and R4 create a 60 Hz square wave used to synchronize the micro controller to power line frequency via port PB2. In the figure, three identical load circuits are shown. For simplicity, only one will be described. A signal from PA4 triggers triac TC1 and allows the light or other device LP1 to turn on.

Components R5, C4 and D3 provide a power-on reset for the Z8 CPU. Crystal XTAL1 and associated capacitors C6 and C7 sets the CPU to run at a precise frequency, shown here as 100 MHz. This frequency is used by the phase control algorithm to vary the amount of time that electricity is allowed to flow to an appliance and thereby to brighten and dim the associated appliance. Again, the Z8E0010PEC is a simple microprocessor used to control the lamps and interpret command signals. Ports +5, PA0, PA1, PA2 and PA3 and resistors R11 and R12 are associated with clock and data functions.

Illustrative Examples of Software Diagrams for Selection and Control of Devices

Figure 15A:
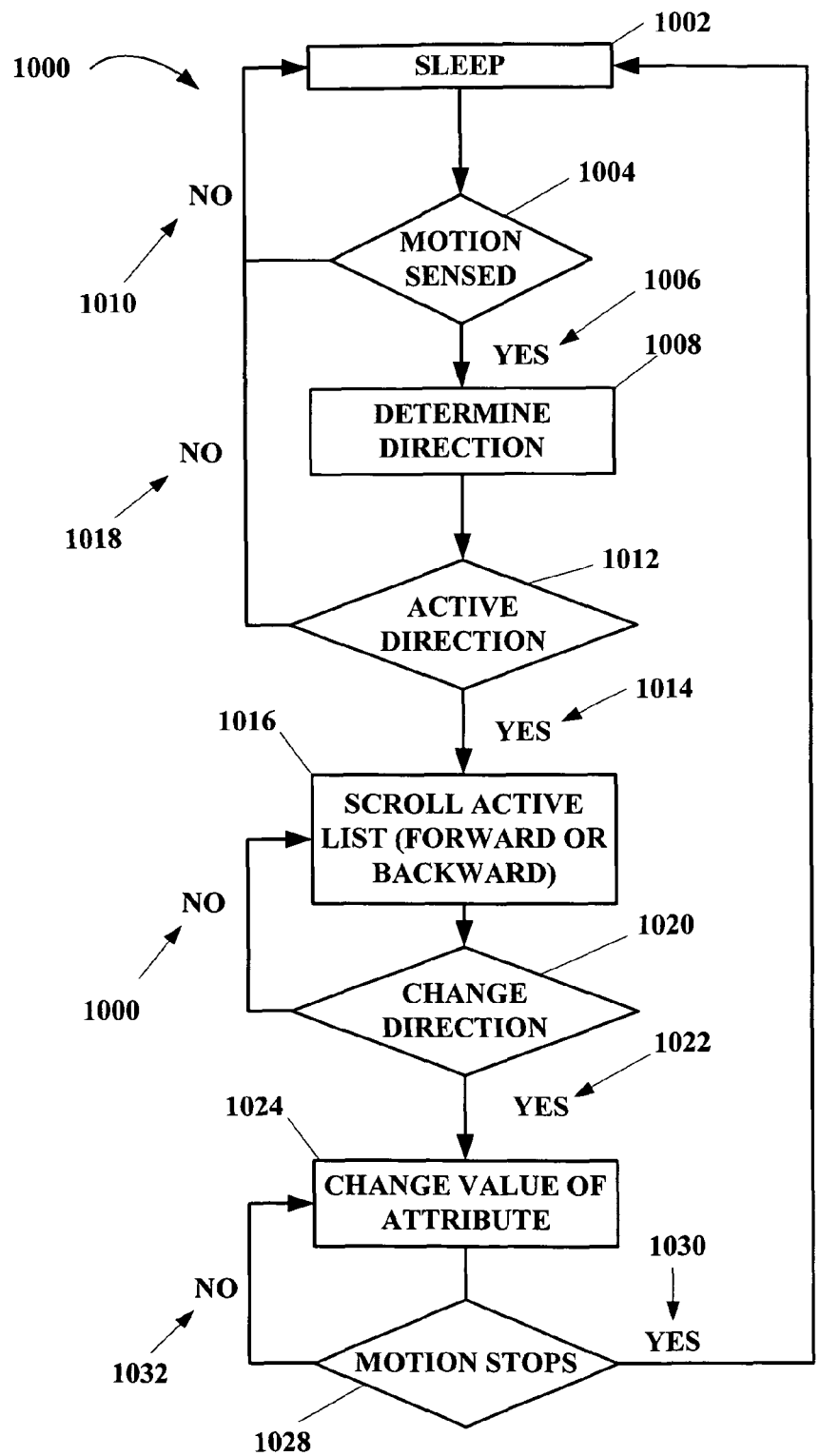
FIG. 15A depicts a conceptual flowchart of a preferred program flow for sensing motion in a switch of this invention and acting on the sensed motion.
Figure 15B:
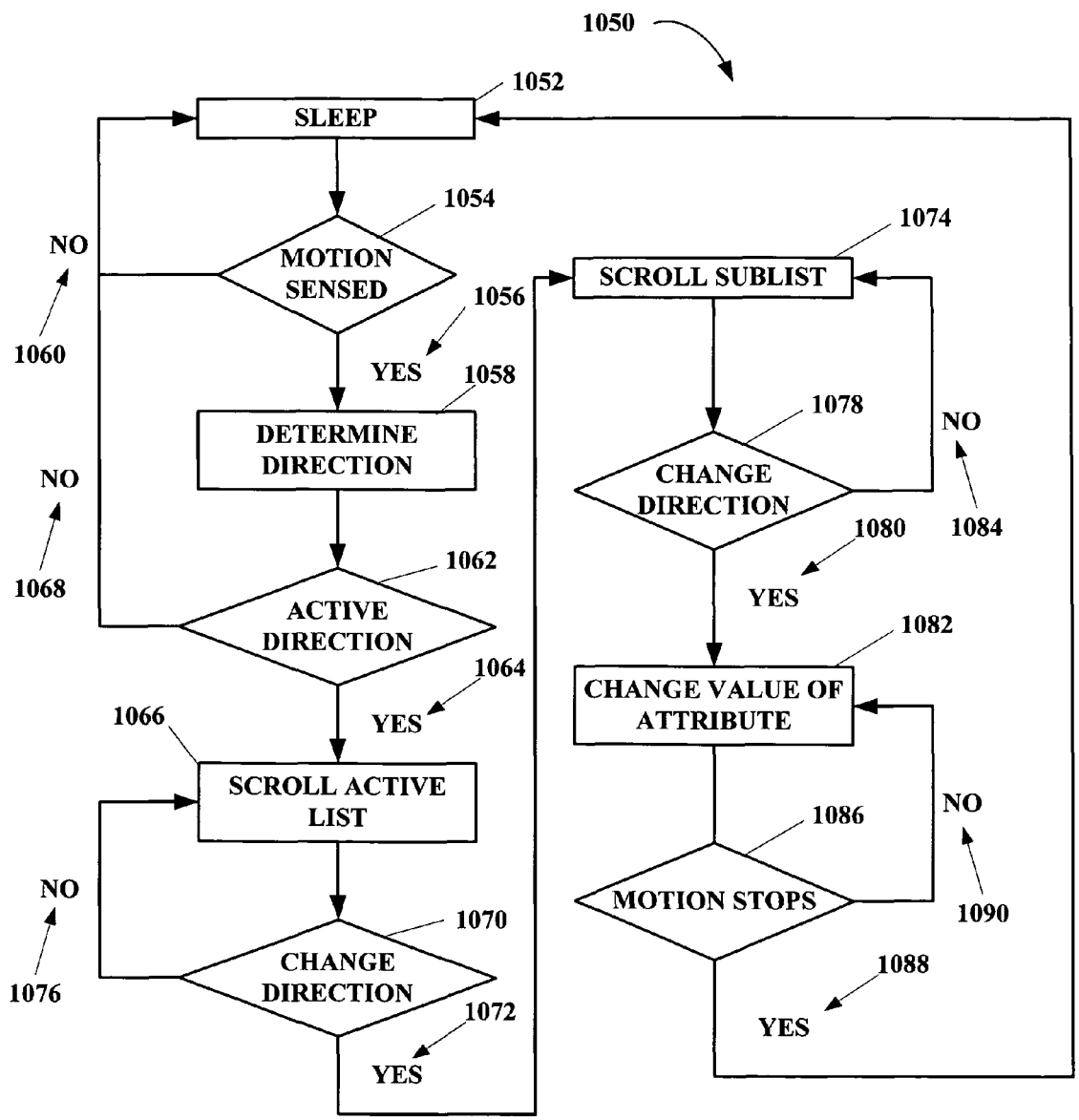
FIG. 15B depicts a conceptual flowchart of another preferred program flow for sensing motion in a switch of this invention and acting on the sensed motion.

Referring now to FIGS. 15A & B, two conceptual software flow diagrams are depicted. FIG. 15A depicts a two level activation protocol, device selection and attribute control; while FIG. 15B depicts a three level activation protocol, switch and/or device selection (list), device and/or attribute selection (sublist) and attribute control. Looking at FIG. 15A, a preferred two level flow diagram 1000 is shown to include a sleep step 1002, adapted to await detection of motion on or in proximity to an interface of this invention. The sleep step 1002 can be implemented in any number of programming methodologies well known in the art. If motion is detected in a conditional step 1004, then control is transferred along a YES branch 1006 to a determine active step 1008; otherwise control is transferred along a NO branch 1010 to the sleep step 1002. If the motion is in the active direction as established by conditional step 1012, then control is transferred along a YES branch 1014 to a scroll active list step 1016; otherwise control is transferred along a NO branch 1018 to the sleep step 1002. Alternatively, the determine direction step 1008 and the conditional step 1012 can be removed, and any motion regardless of direction will result in the execution of the scroll step 1016.

If the direction of motion changes as determined by conditional step 1020, then control is transferred along a YES branch 1022 to a change attribute value step 1024, which selects the desired device from the list where the change in direction was detected allowing the value of the attribute to change; otherwise control is transferred along a NO branch 1026 to the scroll step 1016. The attribute is changed until no further motion is detected or a time out occurs as determined by conditional step 1028, there after control is transferred along a YES branch 1030 to the sleep step 1002; otherwise control is transferred along a NO branch 1032 to the change value step 1016.

Looking at FIG. 15B, a preferred two level flow diagram 1050 is shown to include a sleep step 1052, adapted to await detection of motion on or in proximity to an interface of this invention. The sleep step 1052 can be implemented in any number of programming methodologies well known in the art. If motion is detected in a conditional step 1054, then control is transferred along a YES branch 1056 to a determine active step 1058; otherwise control is transferred along a NO branch 1060 to the sleep step 1052. If the motion is in the active direction as established by conditional step 1062, then control is transferred along a YES branch 1064 to a scroll active list step 1066; otherwise control is transferred along a NO branch 1068 to the sleep step 1052. Alternatively, the determine direction step 1058 and the conditional step 1062 can be removed, and any motion regardless of direction will result in the execution of the scroll step 1066.

If the direction of motion changes as determined by conditional step 1070, then control is transferred along a YES branch 1072 to a scroll sublist step 1074, which selects the desired sublist from the list where the change in direction was detected allowing the sublist to be scrolled; otherwise control is transferred along a NO branch 1076 to the scroll step 1066. If the direction of motion changes as determined by conditional step 1078, then control is transferred along a YES branch 1080 to a change attribute value step 1082, which selects the desired device from the list where the change in direction was detected allowing the value of the attribute to change; otherwise control is transferred along a NO branch 1084 to the sublist scroll step 1074. The attribute is changed until no further motion is detected or a time out occurs as determined by conditional step 1086, there after control is transferred along a YES branch 1088 to the sleep step 1052; otherwise control is transferred along a NO branch 1090 to the change value step 1082.

The description of the present embodiments of the invention have been presented for purposes of illustration but are not intended to be exhaustive or to limit the invention to the form disclosed. Many modifications and variations will be apparent to those of ordinary skill in the art. As such, while the present invention has been disclosed in connection with the preferred embodiment thereof, it should be understood that there may be other embodiments which would fall within the spirit and scope of the invention is defined by the following claims.

All references cited herein are incorporated herein by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

We claim:
1. An interface apparatus comprising:
a user interface for displaying information to a user,
a motion sensor for sensing motion on, near, and/or about the motion sensor and producing an output signal,
a processing unit for receiving output signals from the motion sensor and converting the output signal into a command function, where the command function is a scroll function or a simultaneous select and activate function, and
one system or a plurality systems in electronic communication with and controllable by the processing unit, where one system or a plurality of systems includes a plurality of adjustable attributes and where the processing unit includes a system list having a system identifier for each system and system specific attribute lists, each attribute list having an attribute identifier,
where motion in a first direction causes the motion sensor to produce a first output signal causing the processing unit to issue a scroll function, where the scroll function scrolls through the system list or a system specific attribute list, and where the first direction has a positive component and a negative component for scrolling through the list in forward or backward sense,
where motion in a second direction causes the motion sensor to produce a second output signal causing the processing unit to issue a select and activate function, where the second direction is sufficiently different from the first direction to allow direction discrimination by the motion sensor or the processing unit and where the select and activate function simultaneously selects and activates a member of the list, if the selected member is a system specific attribute list, then the processing unit scrolls through the attributes, or if the selected member is an adjustable attribute, then the processing unit controls a value of the attribute, and where the second direction has a positive component and a negative component for scrolling through a list in forward or backward manner or changing a value of the attribute in an increasing or decreasing manner, and
where if the second output is a scroll function, then motion in a third direction causes the motion sensor to produce a third output signal causing the processing unit to issue a select and activate function, where the third direction is sufficiently different from the first direction to allow direction discrimination by the motion sensor or the processing unit and where the select and activate function simultaneously selects a member from the system specific attribute list and controls a value of the attribute and where the second direction has a positive component and a negative component for scrolling through a list in forward or backward manner or changing a value of the attribute in an increasing or decreasing manner.

2. The apparatus of claim 1, wherein each system is an electrical device or an electronic device.

3. The apparatus of claim 2, wherein each of the systems has a plurality of adjustable attributes and motion in a first direction causes the processing unit to issue a scroll function for scrolling through the system list, motion in a second direction causes the processing unit to issue a select and activate function, which simultaneously selects a desired system and scrolls through its system specific attributes list, and motion in a third direction causes the processing unit to issue a select and activate function, which simultaneously selects a desired attribute and either increases or decreases a value of the attribute depending on the motion in the third direction being in a direction of increasing attribute value or decreasing attribute value, where the first direction and the second directions are different by an amount sufficient to allow direction discrimination by the motion sensor or the processing unit and the second direction and third direction are different an amount sufficient to allow direction discrimination by the motion sensor or the processing unit.

4. The apparatus of claim 2, wherein each electrical device or electronic device is a sound system, a display system, an alarm system, a control system, a medical device, a robot, a robotic control systems, a hot and cold water supply devices, an air conditioning system, a heating system, a ventilation system, an air handling system, a lighting device, a camera, an oven, a dishwasher, a stove, a computer, a computer system, or a chemical plant control system.

5. The apparatus of claim 1, wherein if the selected system has a single adjustable attribute, then the second output results in changing the value of the single adjustable attribute.

6. The apparatus of claim 1, wherein the motion sensor is a digital camera, optical scanner, optical roller ball device, touch pad, inductive pad, capacitve pad, holographic device, laser tracking device, or thermal device.

7. A method comprising the steps of
providing:
  a user interface for displaying information to a user,
  a motion sensor for sensing motion on, near, and/or about the motion sensor and producing an output signal,
  a processing unit for receiving output signals from the motion sensor and converting the output signal into a command function, where the command function is a scroll function or a simultaneous select and activate function, and
  one system or a plurality systems in electronic communication with the processing unit and controllable by the processing unit, where one system or a plurality of systems includes a plurality of controllable attributes and where the processing unit includes a system list having a system identifier for each system and system specific attribute lists, each attribute list having an attribute identifier
sensing motion on, near, and/or about the motion sensor;
producing a first output signal, corresponding to motion in a first direction;
causing the processing unit to issue a scroll function for scrolling through the system list, if there is a plurality of systems or scrolling through a system specific attribute list if there is a single system, where the first direction has a positive component and a negative component;
sensing motion on, near, and/or about the motion sensor;
if the sensed motion is in a direction sufficiently different from the first direction to allow direction discrimination by the processing unit or the motion sensor, producing a second output signal corresponding to a second direction;
causing the processing unit to issue a select and activate function to simultaneously select a member from either the system list or the system specific attribute list and activate the selected member;
if the selected member is a system specific attribute list, then the processing unit scrolls through the system specific attribute list and until motion in a third direction sufficiently different from the second direction to allow direction discrimination by the processing unit or the motion sensor, producing a third output signal, causing the processing unit to issue a select and activate function to simultaneously select a member from the system specific attribute list and activate the selected member and changes a value of the attribute depending on whether the motion in the third direction increases or decreases the attribute value, and
if the selected member is a system specific attribute, then the processing unit changes a value of the attribute depending on whether the motion in the second direction increases or decreases the attribute value.

8. The method of claim 7, wherein each system is an electrical device or an electronic device.

9. The method of claim 8, wherein each electrical device or electronic device is a sound system, a display system, alarm system, a control system, a medical device, a robot, a robotic control system, a hot and cold water supply device, an air conditioning system, a heating system, a ventilation system, an air handling system, a lighting device, a camera, an oven, a dishwasher, a stove, a computer, a computer system, or a chemical plant control system.

10. The method of claim 7, wherein the motion sensor is a digital camera, optical scanner, optical roller ball device, touch pad, inductive pad, capacitve pad, holographic device, laser tracking device, or thermal device.

* * * * *